(12) United States Patent
Maehara et al.

(10) Patent No.: US 9,920,799 B2
(45) Date of Patent: Mar. 20, 2018

(54) DISK BRAKE DEVICE AND BRAKE PAD FOR DISK BRAKE DEVICE

(71) Applicant: AKEBONO BRAKE INDUSTRY CO., LTD., Tokyo (JP)

(72) Inventors: Toshifumi Maehara, Tokyo (JP); Shintaro Izaki, Tokyo (JP)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 14/430,725

(22) PCT Filed: Oct. 25, 2013

(86) PCT No.: PCT/JP2013/078953
§ 371 (c)(1),
(2) Date: Mar. 24, 2015

(87) PCT Pub. No.: WO2014/065400
PCT Pub. Date: May 1, 2014

(65) Prior Publication Data
US 2015/0260244 A1    Sep. 17, 2015

(30) Foreign Application Priority Data

Oct. 26, 2012 (JP) .................................. 2012-236574
Oct. 26, 2012 (JP) .................................. 2012-236577
Sep. 19, 2013 (JP) .................................. 2013-194028

(51) Int. Cl.
*F16D 65/00* (2006.01)
*F16D 55/226* (2006.01)
(Continued)

(52) U.S. Cl.
CPC ....... *F16D 65/0068* (2013.01); *F16D 55/226* (2013.01); *F16D 55/227* (2013.01);
(Continued)

(58) Field of Classification Search
CPC ................ F16D 55/227; F16D 65/092; F16D 2055/0016; F16D 2055/007;
(Continued)

(56) References Cited

U.S. PATENT DOCUMENTS 3,388,774 A * 6/1968 Burnett ................. F16D 55/227
188/196 P
3,532,191 A * 10/1970 Burnett ............. F16D 55/22655
188/196 C
(Continued)

FOREIGN PATENT DOCUMENTS

CN    1653281 A    8/2005
DE    2636442 A1   2/1977
(Continued)

OTHER PUBLICATIONS

Extended European Partial Search Report dated May 31, 2016 in corresponding European patent application 13849576.7 (7 pages).
(Continued)

*Primary Examiner* — Robert A. Siconolfi
*Assistant Examiner* — San Aung
(74) *Attorney, Agent, or Firm* — Drinker Biddle & Reath LLP

(57) ABSTRACT

The disk brake device comprises a caliper body including a cylinder part and a pawl part having a notch section connected together by a center bridge and side bridges with notch sections each interposed between the center bridge and side bridges, a support including guide pin guiding parts each interposed between the cylinder part and pawl part, guide pins respectively slidable to the guide pin guiding parts, and an outer side brake pad threadedly engaged with such surface of the pawl part as is opposed to a rotor on the rotor turn-in and turn-out sides of the notch section.

14 Claims, 13 Drawing Sheets

(51) Int. Cl.
  *F16D 55/227* (2006.01)
  *F16D 65/097* (2006.01)
  *F16D 55/2265* (2006.01)
  *F16D 65/092* (2006.01)
  *F16D 65/18* (2006.01)
  *F16D 55/00* (2006.01)

(52) U.S. Cl.
  CPC ..... *F16D 55/2265* (2013.01); *F16D 65/0006* (2013.01); *F16D 65/0087* (2013.01); *F16D 65/0093* (2013.01); *F16D 65/092* (2013.01); *F16D 65/0977* (2013.01); *F16D 65/0978* (2013.01); *F16D 65/0979* (2013.01); *F16D 65/18* (2013.01); *F16D 2055/0016* (2013.01); *F16D 2055/0037* (2013.01); *F16D 2055/0041* (2013.01)

(58) Field of Classification Search
  CPC ..... F16D 2055/0041; F16D 2055/0091; F16D 55/226; F16D 55/2265; F16D 65/18; F16D 65/0006; F16D 65/0068; F16D 65/0087; F16D 65/0093; F16D 65/0977; F16D 65/0978; F16D 65/0979; F16D 2055/0037; F16D 65/14; F16D 65/827
  USPC .................. 188/72.4, 71.1, 247, 250 B, 258
  See application file for complete search history.

(56) References Cited

U.S. PATENT DOCUMENTS

| | | | |
|---|---|---|---|
| 4,072,216 A | | 2/1978 | Haraikawa |
| 4,385,680 A | * | 5/1983 | DuCharme ........... F16D 55/227 188/72.4 |
| 4,391,355 A | * | 7/1983 | Evans .................. F16D 65/095 188/73.1 |
| 4,540,068 A | * | 9/1985 | Ritsema .............. F16D 55/2262 188/196 P |
| 4,609,079 A | | 9/1986 | Mery |
| 5,083,641 A | * | 1/1992 | Kleiva ................. F16D 55/226 188/250 B |
| 5,706,917 A | * | 1/1998 | Matsuzaki .......... F16D 65/0979 188/250 D |
| 5,860,496 A | * | 1/1999 | Kullman ............... F16D 55/227 188/73.37 |
| 5,957,245 A | * | 9/1999 | Anger .................. F16D 55/227 188/247 |
| 6,179,095 B1 | | 1/2001 | Weiler et al. |
| 7,849,982 B1 | * | 12/2010 | Tamura ................. F16D 55/227 188/250 B |
| 2001/0004034 A1 | * | 6/2001 | Brosilow ............ F16D 65/0006 188/73.37 |
| 2001/0013448 A1 | * | 8/2001 | Schorn .................. F16D 65/097 188/71.1 |
| 2005/0173205 A1 | | 8/2005 | Bach et al. |
| 2005/0236237 A1 | | 10/2005 | Barrett et al. |
| 2006/0060431 A1 | | 3/2006 | Schog et al. |
| 2009/0236187 A1 | | 9/2009 | Bach et al. |
| 2009/0255766 A1 | * | 10/2009 | Kappagantu ........ F16D 65/0018 188/73.37 |
| 2013/0256068 A1 | * | 10/2013 | Hazeki ................. F16D 55/226 188/72.4 |

FOREIGN PATENT DOCUMENTS

| | | |
|---|---|---|
| DE | 100 27 783 A1 | 1/2002 |
| FR | 2965027 A1 | 3/2012 |
| GB | 2 019 968 A | 11/1979 |
| JP | S54-137572 A | 10/1979 |
| JP | S56-80530 A | 7/1981 |
| JP | S57-149629 A | 9/1982 |
| JP | H05-36137 U | 5/1993 |
| JP | H08-49736 A | 2/1996 |
| JP | 2001-503500 A | 3/2001 |
| JP | 2002-089596 A | 3/2002 |
| JP | 2004-204936 A | 7/2004 |
| JP | 2005-023944 A | 1/2005 |
| JP | 2005-525519 A | 8/2005 |
| JP | 2005-308224 A | 11/2005 |
| JP | 2006-520450 A | 9/2006 |
| JP | 2009-534599 A | 9/2009 |
| JP | 4658920 B2 | 3/2011 |
| JP | 2012-117654 A | 6/2012 |

OTHER PUBLICATIONS

CN Office Action dated Jun. 14, 2016 from corresponding Chinese patent application No. 201380056264.2 (with attached English-language translation).

* cited by examiner (A)

(B)

(C)

(A)

(B)

(C)

DISK BRAKE DEVICE AND BRAKE PAD FOR DISK BRAKE DEVICE

TECHNICAL FIELD

The invention relates to a disk brake device and a brake pad for a disk brake device.

BACKGROUND ART

In a disk brake device, to obtain high braking force, it is desired to employ a large-diameter rotor, whereas a disk brake device to be stored in the inside diameter of a wheel is restricted in space when mounting it.

From this viewpoint, a caliper body constituting a disk brake device is strongly demanded for miniaturization. Further, to enhance the motion performance of a vehicle, the device is also required of weight reduction. Here, when compared with an opposed type disk brake device having pistons on both inner and outer sides of a rotor, a floating type disk brake device is proper for miniaturization, weight reduction and inexpensive production.

In the floating type disk brake device, as a device proposed especially for miniaturization and weight reduction, there is known a device of a type disclosed in the patent document 1 and 2. The disk brake device of the patent document 1 and 2, normally, employs a structure in which a pressure plate serving as the back plate of a brake pad disposed on the outer side of a rotor is used, instead of a pawl part disposed on the inner side of the rotor, as a reaction force receiver for receiving a pressing force given by a piston. That is, the pressure plate of the outer side brake pad, as it is, is fixed as a part of a caliper body.

The thus structured disk brake device can surely realize miniaturization and weight reduction. However, since the reaction force receiver is constituted of only the pressure plate, there is a fear of the caliper body being insufficient in strength.

Also, the patent document 3 discloses a floating type disk brake device which eliminates the outer bridge of a support conventionally disposed on the outer side of a rotor to thereby reduce the weight of the whole device. In the disk brake device of the patent document 3, the pressure plate of an outer side brake pad conventionally guided by the support on the outer side is bolt fixed to a pawl part serving as the reaction force receiver of a caliper body. In the thus structured disk brake device, the pressure plate reinforces the rigidity of the caliper body, whereas the bridge of the caliper body is small in thickness. This raises a fear that, in braking, an amount of tilting in the caliper body can increase to thereby cause uneven wearing or the like.

Further, the patent document 4 discloses a disk brake device which includes a frame for surrounding the lower side edge portion of a caliper in order to enhance the stability and twist rigidity of the caliper. In the thus structured disk brake device, the outer side bridge of a support for connecting together the rotor turn-in and turn-out sides of the outer side frame of the support is eliminated for weight reduction. An outer side brake pad is spring supported on a pawl part to enable the pawl part of the caliper to receive brake torque in part, whereby the rigidity of the whole caliper is enhanced by a frame surrounding the edge portion of the caliper.

As a technique for enhancing the performance of a disk brake device, there is known a technique capable of using brake torque reception on the rotor turn-in and turn-out sides properly. Like the patent document 4 and 5, in a disk brake device which eliminates the outer bridge of the support, the torque of the outer side brake pad in braking can be received by a slide member.

Also, a brake pad for use in a disk brake device includes a brake pad (inner side brake pad) to be disposed on the inner side of a rotor and a brake pad (outer side brake pad) to be disposed on the rotor outer side. Especially, in some of floating-type disk brake device, the mode for holding an inner side brake pad and the mode for holding an outer side brake pad are different.

For example, in a disk brake device disclosed in the patent document 6, an inner side brake pad employs a holding mode using a support for supporting a caliper body. Meanwhile, an outer side brake pad employs a holding mode for hanging it on one end of a guide pin extended from the support.

Also, in the disk brake device of the patent document 3, the inner side brake pad is held by a rail-shaped guide provided on the bridge of the caliper body and a pipe-shaped guide mounted on the support. Meanwhile, the outer side brake pad is held by bolt fixing it to the pawl part of the caliper body.

Unlike the disk brake device of the patent document 3 and 6, the patent document 7 discloses a disk brake device in which holding modes for inner side and outer side brake pads are similar. The disk brake device of the patent document 7 adopts a support structured to straddle a rotor, and guide pins are projected toward the rotor arranged side respectively from the rotor inner and outer sides of the support to thereby hold the inner and outer side brake pads.

CITATION LIST

Patent Document

[Patent Document 1] Japanese Patent Publication No. 08-49736
[Patent Document 2] Japanese Patent Publication No. 2002-89596
[Patent Document 3] Japanese Patent Publication No. 56-80530
[Patent Document 4] Japanese Patent Publication No. 2001-503500
[Patent Document 5] Japanese Patent No. 4658920
[Patent Document 6] Japanese Patent Publication No. 54-137572
[Patent Document 7] Japanese Patent Publication No. 2006-520450

SUMMARY OF INVENTION

Technical Problem

As described above, according to the disk brake device of the patent document 1 and 2, due to elimination of the pawl part disposed on the caliper outer side, the device can be miniaturized and reduced in weight when compared with the conventional device. However, since the pressure plate of the outer side brake pad is used as a reaction force receiver for receiving pressure by the piston, there is a fear that spreading of the caliper caused in braking can increase to make the rigidity of the caliper insufficient.

Also, in the disk brake device of the patent document 3, bolt-fixation of the outer side brake pad to the pawl part eliminates the support to be disposed on the outer side, thereby enabling weight reduction. However, with this structure, the brake torque of the outer side brake pad is all received by the pawl part. This raises a fear that the amount of tilting of the caliper can be increased to cause uneven wearing.

Further, in the disk brake device of the patent document 4, although the outer side bridge of the support is eliminated for weight reduction, provision of the frame surrounding the whole area of the caliper lower side edge reduces the effect of weight reduction. Also, since the outer side frame of the support is located inside the outer periphery of the rotor, a notch section for prevention of interference with the caliper must also be formed by hollowing the pawl part greatly, thereby lowering the rigidity of the caliper. Thus, the shortage of the whole rigidity is supplied by increasing the back thickness of the bridge connecting together the cylinder part and pawl part of the caliper. However, this raises the need to increase a clearance between the rotor and wheel inner wall correspondingly to the increased back thickness.

Thus, a first object of the invention is to provide a disk brake device which can reduce weight, keep proper rigidity and can be mounted on a narrow wheel space.

Also, recently, besides the weight-reduced wheel, there has been prevalent a wheel with design property emphasized. With use of such wheel, the appearance of the outer side of the disk brake device can be visually observed from between spokes constituting the wheel to enhance the interest of a customer in the design property thereof.

Thus, for a vehicle employing a floating type disk brake device, there is provided a cover capable of covering the whole caliper and providing such appearance as an opposed type disk brake device. However, the conventional cover for covering the whole caliper increases the weight of the whole disk brake device to thereby lower the fuel consumption performance of the vehicle. Also, since assembly workability is unstable due to enhanced versatility, there is a danger of it slipping off during traveling of the vehicle. Further, covering of the whole caliper also raises a fear of reducing an action to release heat generated in braking to thereby lower braking performance. As described above, the conventional cover is not functional nor ecological.

Thus, it is a second object of the invention to provide a cover for a disk brake which basically can enhance the appearance design of a disk brake device, is light in weight, is excellent in stable assembly and can prevent the lowered brake performance, and further can provide a caliper body rigidity enhancing action.

Also, in the brake pad of the disk brake device of the patent document 7 and in the outer side brake pad of the disk brake device of the patent document 6, the tangential force in braking is received only by the guide pin provided on the support. With this structure, the attitude of the caliper body is prevented against inclination but the tangential force of the outer side brake pad is applied to the leading end side of the guide pin. Thus, when the tangential force to be applied in braking is high, the distortion of the guide pin increases to cause the lining to wear unevenly. And, when the guide pin distortion is generated plastically, the sliding characteristics of the caliper body is worsened to have a bad influence on brake characteristics as well.

Also, in the disk brake device of the patent document 3, the tangential force in braking is received by the pawl of the caliper body. With this structure, when the tangential force in braking is high, the inclination of the attitude of the caliper body is increased to easily cause uneven wearing in the lining.

In order to solve these problems, in the patent document 6 and 7, the diameter of the guide pin is increased to thereby enhance the rigidity. In the patent document 3, the whole thickness of the caliper body is increased to thereby increase the rigidity. However, in any cases, enhancement in the rigidity of the respective elements incurs the increased weight of the whole disk brake device, thereby worsening the fuel consumption characteristic and moving performance of the vehicle and increasing the size of the disk brake device to thereby lower the mounting versatility thereof.

Thus, it is a third object of the invention to provide a brake pad for a disk brake device which, while realizing the weight reduction of the device, can secure the stability of the attitude of a caliper body in braking and can prevent a friction member against uneven wearing.

Solution to Problems

The first object of the invention is attained by the following structures (1)-(11).

(1) A disk brake device, comprising:
a caliper body including a cylinder part which is disposed on an inner side of a rotor, a pawl part which is disposed on an outer side of the rotor and has an inner peripheral side notch section at a position opposed to a cylinder arranged position and outer side notch sections, wherein the cylinder part and the pawl part are connected together by a center bridge and side bridges respectively disposed on a turn-in side and a turn-out side of the rotor with the center bridges as base points thereof, and the outer side notch sections are respectively interposed between the center bridges and the side bridges;

a support including guide pin guiding parts exposed to an outside of the caliper body from the outer peripheral side notch sections and disposed in a range of a thickness of a back part of the caliper body constituting the center bridge and the side bridges, the guide pin guiding parts being interposed between the cylinder part and the pawl part;

guide pins slidable with respect to the guide pin guiding parts of the support; and an inner side brake pad and an outer side brake pad respectively disposed on the inner side and outer side of the rotor, wherein the outer side brake pad is threadedly engaged with such a surface of the pawl part opposed to the rotor on the turn-in side and the turn-out side of the rotor with respect to the inner peripheral side notch section.

(2) The disk brake device having the structure of (1), wherein
each of the guide pin guiding parts includes a sleeve made of a member having similar strength to the guide pin, and
the guide pin slides on the inner peripheral side of the sleeve.

With this structure, even when the guide pins and support are formed of different materials, the sliding surfaces of the guide pins provide the sleeve inner peripheral surfaces formed of material having similar strength. This prevents occurrence of electric erosion (scientific corrosion) or damage on the sliding surfaces to thereby prevent the worsened sliding performance thereof and also prevents facilitation of wearing in one (member formed of soft material) of these members.

(3) The disk brake device having the structure of (2), wherein
the guide pin has a length so as to reach the opposed surface of the pawl part to the rotor within the sleeve, and the outer side brake pad includes a friction member and a pressure plate threadedly engageable with the pawl part, and the pressure plate includes an ear part contactable with the sleeve in braking.

With this structure, when the caliper deflects to increase the titling amount, the tangential force from the outer side brake pad is received by the sleeve (guide pin disposed within the sleeve), whereby uneven wearing due to the increased tilting amount can be prevented.

(4) The disk brake device having the structure of (3), wherein
the ear part includes a contact surface with respect to the sleeve situated on the turn-out side of the rotor.

With this structure, when the tangential force in braking is large, the ear part provides a push anchor state with respect to the sleeve.

(5) The disk brake device having the structure of (4), wherein
the outer peripheral side notch section includes, on its side wall on a side of the side bridges situated on the turn-in side of the rotor, a contact surface contactable with the sleeve.

With this structure, with respect to the tangential force in braking, the contact surface formed on the side bridge provides a pull anchor state, while the ear part of the outer side brake pad provides a push anchor state.

(6) The disk brake device having the structure of (3), wherein
the ear parts have contact surfaces contactable with the sleeves respectively situated on both of the turn-in and turn-out sides of the rotor.

With this structure, when the tangential force in braking is large, the ear part can provide both of push and pull anchor actions with respect to the sleeve.

(7) The disk brake device having any one of the structures of (4) to (6), wherein,
where an axis parallel to a straight line passing a rotation center of the rotor and a center of the cylinder arranged positions is defined as a Y axis, two or four of the contact surfaces with respect to the sleeves are parallel to each other and are also parallel to the Y axis.

With this structure, the transmission loss of the tangential force from the pressure plate to the sleeve can be reduced.

(8) The disk brake device having any one of the structure of (3) to (6), wherein,
a surface of the pressure plate opposed to the pawl part are provided with bosses configured to be fitted into penetration holes formed in the ear parts for threaded engagement.

With this structure, even when the bolt provided for threaded engagement slips off, the outer side brake pad is caught by the bosses to thereby prevent it from slipping off.

(9) The disk brake device having any one of the structures of (2) to (6), wherein,
an anti-rattle spring is interposed between the caliper body and the sleeve.

With this structure, provision of the anti-rattle spring can prevent the caliper body from shaking and falling down. Thus, a ratting sound can be prevented and, with stabilized attitude of the caliper body, the uneven wearing or the like of the lining can be prevented, thereby enabling stable braking performance.

(10) The disk brake device having any one of the structures of (3) to (6), further comprising a pad clip including:
a cover plate for covering at least one of contact portions of the sleeves with the outer side brake pad and with the caliper body; and
a main body plate interposed between the pressure plate and the pawl part,
wherein the cover plate and the main body plate are connected together by a spring member.

With this structure, electric erosion due to contact between different metal materials and wearing and abrasion due to sliding motion and shocks can be prevented.

(11) The disk brake device having any one of the structures of (1) to (6), further comprising:
a cover for filling a step between the inner peripheral side notch section and the pawl part.

With this structure, the design property of the appearance of the disk brake device can be enhanced.

Also, the second object of the invention can be attained by the following (12) and (13) structures.

(12) The disk brake device having the structure of (11), wherein the cover includes:
a base plate interposed between the pawl part and a pressure plate of the outer side brake pad; and
a cover plate exposed to the outer side through the inner peripheral side notch section formed in the pawl part.

With this structure, the design property of the appearance of the disk brake device can be enhanced, the weight can be reduced, the assembling stability can be enhanced, and the lowered braking performance can be prevented. Also, the rigidity of the caliper body can be enhanced by the cover.

(13) The disk brake device having the structure of (12), wherein
the base plate has a fixing hole capable of fastening itself to the pawl part together with the outer side brake pad.

With this structure, the assembled state of the cover to the caliper can be stabilized more.

Also, the third object of the invention can be attained by the following (14) to (18) structures.

(14) A brake pad for a disk brake device, comprising:
a friction member; and
a pressure plate to which the friction member is adhered, wherein
the pressure plate includes at least two bosses projecting from a surface opposed to a surface to which the friction member is adhered, and torque receiving parts respectively disposed on a turn-in side and a turn-out side of a rotor, and
female screw holes for fixing the pressure plate to a caliper body are formed along a projecting direction of the bosses in projecting surfaces of the bosses.

(15) The brake pad for a disk brake device having the structure of (14), wherein
the bosses are disposed at positions existing on an inner peripheral side relative to an outside diameter of the rotor, and
the torque receiving parts are disposed at positions existing on an outer peripheral side relative to the outside diameter of the rotor.

With this structure, the boss of the pressure plate is disposed in the range where the tangential force in braking is loaded and thus, in the assembled state, the tangential force can be transmitted to the caliper body with no loss. Meanwhile, when the torque receiving part of the pressure plate is disposed on the outer peripheral side with respect to the rotor outside diameter, there is eliminated the need to dispose the support, guide pins and the like serving as anchors in the disk brake device on the outer side surface of the rotor. Thus, the weight of the whole disk brake device can be reduced. Also, the torque receiving part of the pressure plate is disposed nearer to the outer peripheral side than the friction member, thereby being able to reduce the tangential force to be loaded to the support, guide pins and the like serving as anchors.

(16) The brake pad for a disk brake device having the structure of (15), wherein the bosses are disposed so that a straight line connecting centers of a pair of the bosses is parallel to a straight line extending along a loading direction of a tangential force applied in braking and is situated at a position passing a center of a cylinder of the caliper body or vicinity thereof when viewed from a front in an assembled state.

With this structure, the transmission loss of the tangential force in braking to the caliper body can be minimized.

(17) The brake pad for a disk brake device having the structure of (16), wherein each of the torque receiving parts includes a recess-shaped notch having an opening in an inner peripheral direction of the rotor, and opposed surfaces of the recess-shaped notch are used as torque receiving surfaces.

With this structure, an anchor is disposed within the recess-shaped notch. Also, regardless of the rotation direction of the rotor, the tangential force can be transmitted to the anchor by pushing or by pulling. Also, after the brake pad is fastened and fixed to the caliper body, the caliper body can be assembled to the support from the outer peripheral side of the rotor so as to cover the support.

(18) The brake pad for a disk brake device having the structure of (17), wherein the opposed surfaces of the recess-shaped notch are parallel to each other and are parallel to a Y axis being a straight line parallel to a straight line passing a position overlapping with the center of the cylinder and a position overlapping with a rotation center of the rotor.

With this structure, the tangential force applied in braking can be transmitted to anchors such as the guide pin and support with no loss. Thus, even when the torque receiving surface is caused to slide, it is possible to prevent the caliper body against inclination in attitude and the friction member against uneven wearing.

BRIEF DESCRIPTION OF DRAWINGS

FIG. 9(A) is a front view, FIG. 9(B) is a left side view, and FIG. 9(C) is a perspective view.

FIG. 25(A) is a front view, FIG. 25(B) is a plan view and FIG. 25(C) is a right side view.

FIG. 26(A) is a front view, FIG. 26(B) is a plan view, FIG. 26(C) is a right side view and FIG. 26 (D) is a perspective view.

DESCRIPTION OF EMBODIMENTS

Figure 1:
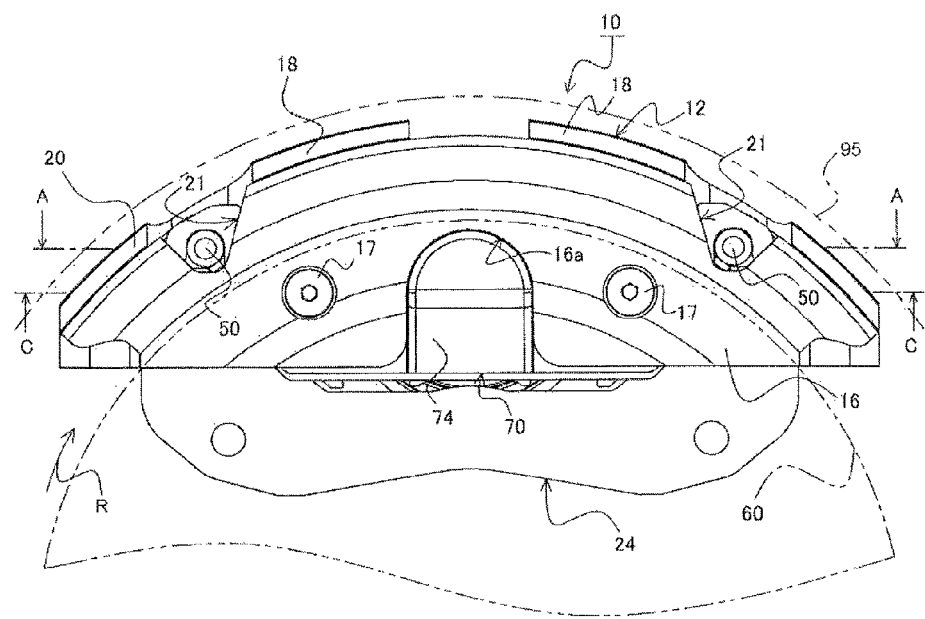
FIG. 1 is a front view of the structure of a disk brake device according to a first embodiment of the invention.

Description is given below specifically of embodiments of a disk brake device and a brake pad for such device according to the invention with reference to the drawings.

Firstly, referring mainly to FIGS. 1 to 9, description is given of a first embodiment of the disk brake device of the invention.

A disk brake device 10 of the first embodiment basically includes a caliper body 12, a support 24, an inner side brake pad 34, an outer side brake pad 42, and a rotor 60.

The caliper body 12 includes a cylinder part 14, a pawl part 16, a center bridge 18 and side bridges 20. The cylinder part 14 is a drive source of the disk brake device 10 of the first embodiment and includes a piston 14a and a cylinder 14b for storing and projecting the piston 14a. The cylinder part 14 also includes guide pin assembling sections 22 for assembling guide pins 52 to be described later specifically. The guide pin assembling sections 22 are formed to be situated outwardly of the outer periphery of the rotor 60. The reason for this is that the assembled guide pins 52 can be situated outwardly of the outer periphery of the rotor 60 to prevent interference between the rotor 60 and guide pins 52.

The pawl part 16 is a reaction force receiver for receiving a pressure force generated by the piston 14a. The pawl part 16 has a notch section 16a (inner peripheral side notch section) formed at a position opposed to the cylinder forming position of the cylinder part 14. The reason for this is that the inner periphery of the cylinder 14b of the cylinder part 14 is machined using the notch section 16a. The respective blocks (in this embodiment, two blocks) constituting the pawl part 16 have penetration holes 16b (see FIG. 12) for insertion of their associated bolts. The penetration hole 16b may preferably be a step hole structured to prevent the bolt head of a bolt 17 from projecting to the outside. The reason for this is that, since the caliper body 12 is arranged in a limited space between the rotor 60 and a wheel inner wall 95, by reducing a portion projecting from the caliper body 12, interference with the wheel can be prevented and formation of a flat surface can enhance the appearance of the device.

The cylinder part 14 and pawl part 16 are connected together by center bridge 18 and side bridges 20 straddling an area existing outwardly of the outer periphery of the rotor 60. In the disk brake device 10 of the first embodiment, the center bridge 18 has, in its center, a penetration hole 19. Formation of the penetration 19 can facilitate visual confirmation of wearing of linings 36 and 44 in the brake pads (that is, inner side brake pad 34 and outer side brake pad 42) and can also contribute to dissipation of heat generated in braking. The side bridges 20 are respectively provided on the turn-in side (I) and turn-out side (O) of the rotor 60 with the center bridge 18 as their base points. Provision of the side bridges 20 allows the caliper body 12 to provide a structure having a frame-type frame in a plan view. Thus, the rigidity of the caliper body 12 can be enhanced.

Therefore, even when the caliper body 12 is made of aluminum (including an alloy mainly constituted of aluminum) softer than cast iron, while reducing the thickness (so called back thickness) of the center bridge 18, spreading between the cylinder part 14 and pawl part 16 and distortion (tilting) in the rotor turning direction caused in braking can be prevented. By reducing the thicknesses of the center bridge 18 and side bridges 20, even when a clearance between the wheel inner wall 95 of the wheel and the outer periphery of the rotor 60 is narrow, the caliper body 12 can be disposed in such narrow clearance.

Unless the caliper body 12 can be fitted between the wheel inner wall 95 and the outer periphery of the rotor 60, the wheel must be inched up or the rotor must be reduced in size. In this case, for example, when the wheel is inched up, the flatness of a tire must be reduced, thereby worsening riding comfort, or mounting of a large-diameter wheel may incur increased cost. Also, in the case of size reduction of the rotor, when the piston diameter is increased and the same liquid pressure is applied to the rotor, there arises the need to secure a wide pressure surface. The reason for this is that, when, by raising liquid pressure, high pressure is applied to the rotor, spreading between the cylinder part and pawl part in braking is caused to increase. And, employment of a large-diameter piston also raises some problems, for example, the weight can be increased and the touch feeling of a pedal in braking can be worsened.

With the above structure, use of light material such as aluminum for the caliper body 12 can reduce the weight of the whole disk brake device 10 and also can contribute toward enhancing the traveling performance of a vehicle.

Between the center bridge 18 and side bridges 20, there are interposed notch sections 21 (outer peripheral side notch sections) respectively formed to lean against the pawl part 16. The notch sections 21 are situated at positions corresponding to the guide pin assembling sections 22 of the cylinder part 14. The reason for this is to prevent interference between the guide pin guiding parts 32 (in this embodiment, sleeves 50 provided in the guide pin guiding parts 32) of the support 24 for sliding the guide pins 52 and caliper body 12.

Also, the notch section 21, on the pawl part 16 side, is disposed in the range of the portion that exists outwardly of the outer periphery of the rotor 60. When the notch section 21 is extended to the range existing inwardly of the outer periphery of the rotor 60, the connecting portions between such portions of the pawl part 16 as are connected to the side bridges 20 and such portions thereof as are connected to the center bridge 18 are reduced to thereby cause deflection of the connecting portions. This reduces the effect to prevent deflection of the center bridge 18 due to the rigidity of the side bridges 20 and thus, in order to prevent spreading and twisting of the caliper body 12, the thickness of the center bridge 18 must be increased. Meanwhile, by suppressing the range of the notch sections 21 to the minimum range existing outwardly of the outer periphery of the rotor 60, the rigidity of the whole caliper body 12 can be enhanced and a force involved with twisting and spreading can be dispersed.

The support 24 is fixed to a vehicle body and supports the caliper body 12 slidably. In this embodiment, the support body 24 is located between the cylinder part 14 and pawl part 16 of the caliper body 12, that is, within the frame of the caliper body 12.

The support 24 includes at least anchors 26, a bridge 28, mounting holes 30 and guide pin guiding parts 32. The anchors 26 are disposed on the turn-in side (I) and turn-out side (O) of the rotor 60 respectively. In this embodiment, the anchors 26 support the inner side brake pad 34 and serve as torque receivers which, while the inner brake pad 34 is in braking, receive forces going to move together with the rotation of the rotor 60.

The bridge 28 is a connecting member which connects together the anchor 26 on the turn-in side (I) and the anchor 26 on the turn-out (O) of the rotor 60. The mounting holes 30 are formed in the connecting portions between the anchors 26 and bridge 28 and are used to fasten the support 24 to mounting holes (not shown) formed in a vehicle through bolts (not shown).

The guide pin guiding parts 32 are penetration holes or blind holes formed at positions which exist in the leading ends of the paired anchors 26 and, in the assembled state, exist outwardly of the outer periphery of the rotor 60. In this embodiment, the guide pin guiding parts 32 are formed as penetration holes, the bag-shaped sleeves 50 are disposed in the penetration holes, and the guide pins 52 can be slid into the sleeves 50

Even when the support 24 is made of light metal such as aluminum in order to reduce the weight of the disk brake device 10, the guide pins 52 serving as sliding members are made of steel material such as iron. The different composing materials can cause electric erosion (electro-chemical corrosion) between them to thereby worsen the sliding performance. Thus, when the sleeves 50 are disposed in the portions to be contacted by the sliding members and the sleeves 50 are made of materials of the same quality of the guide pins 52, electric erosion between them can be prevented and weight can be reduced. Also, when the material of the support 24 is softer than that of the guide pins 52, sliding can cause the guide pin guiding parts 32 to wear. However, use of sleeves 50 made of hard material can prevent such wearing.

Here, the guide pins 52 are rod-shaped members to be assembled to the guide pin 52 assembling sections 22 of the cylinder part 14 of the caliper body 12. In assembling, the base ends of the guide pins 52 are disposed on the cylinder part 14 and the leading ends thereof are disposed on the pawl part 16 side. Here, the length of the guide pin 52 may be a length which, after assembled, substantially reaches the surface of the pawl part 16 opposed to the rotor 60.

Here, the guide pin guiding parts 32, sleeves 50 and guide pins 52 are arranged to be situated at the notch sections 21 of the caliper body 12 in the assembled state. Such structure can prevent the guide pin guiding parts 32, sleeves 50 and guide pins 52 to be disposed more outwardly of the outer periphery of the rotor 60 from interfering with the caliper body 12. Here, the guide pin guiding parts 32, sleeves 50 and guide pins 52 are respectively arranged to exist inside an arc formed by connecting the center bridge 18 of the caliper body 12 to the two side bridges 20 (that is, within the range of the thickness of the back portion). With this structure, in an area capable of storing the caliper body 12, the guide pin guiding parts 32 and the like can be prevented from interfering with the wheel and the like.

The inner side brake pad 34 is disposed on the inner side of the rotor 60 and can be pressed directly by the piston 14a of the cylinder part 14. The inner side brake pad 34 includes a lining 36 serving as a friction member contactable with the sliding surface of the rotor 60 and a pressure plate 38 made of a steel plate with the lining 36 to be adhered thereon. The inner side brake pad 34 is held by the anchor 26 of the support 24 and can be slid in the axial direction of the rotor 60. Thus, on the ends (ends which, in the assembled state, are situated on the turn-in side (I) and turn-out side (O) of the rotor 60) of the pressure plate 38), there are formed projection-shaped ear parts 40 corresponding in shape to recesses formed in the inside of the anchors 26. Here, in assembling, between the anchors 26 and ear parts 40, there are interposed pad clips 54 for preventing the inner side brake pad 34 from shaking and for keeping the sliding property thereof in the axial direction (see FIG. 7).

The outer side brake pad 42 is disposed on the outer side of the rotor 60 and is pressed toward the rotor 60 by the pawl part 16 due to a reaction force generated when the inner side brake pad 34 is pressed against the rotor 60. The outer side brake pad 42, similarly to the inner side brake pad 34, includes a lining 44 serving as a friction member and a pressure plate 46. The lining 44 is adhered on the surface which is one surface of the pressure plate 46 and, in the assembled state, is situated on the arrangement surface side of the rotor 60 (see, for example, FIGS. 1 and 2). In this embodiment, the inner side brake pad 34 and outer side brake pad 42 are different in the mode of the pressure plate 46. In the disk brake device 10 of the first embodiment, the outer side brake pad 42 is threadedly engaged with the pawl part, that is, is fixed by the bolt 17. Thus, in the pressure plate 46, there are formed female screw holes 46a (see FIG. 8).

The female screw holes 46a may be formed at positions corresponding to the penetration holes 16b of the pawl part 16. Thus, the outer side brake pad 42 can be fixed to the pawl part 16 by bolts 17 through the penetration holes 16b. In each of the two blocks of the pawl part 16 divided by the notch section 16a, by bolt fastening the pressure plate 46 made of a steel plate, the pawl part 16 and pressure plate 46 can be regarded as a lump of structure and thus the rigidity of the pawl part 16 (caliper body 12) can be enhanced with the pressure plate 46 as a reinforcing member. Also, fixation of the outer side brake pad 42 to the pawl part 16 eliminates the need for sliding holding by the support 24. This eliminates the need to form an outer side frame in the support 24, thereby miniaturizing the support 24. Thus, manufacturing cost and weight can be reduced. Also, the areas of the interference-preventive notch sections 21 of the caliper body 12 can be reduced.

Also, the female screw holes 46a, when the rotor 60 is regarded as its reference, are disposed inside (on the inner peripheral side of the rotor 60) the rotor 60 with the outer periphery of the rotor 60 as its base point. Further, when the outer side brake pad 42 is viewed from front, the female screw holes 46a are disposed in the range of the friction surface of the lining 44.

Figure 8:
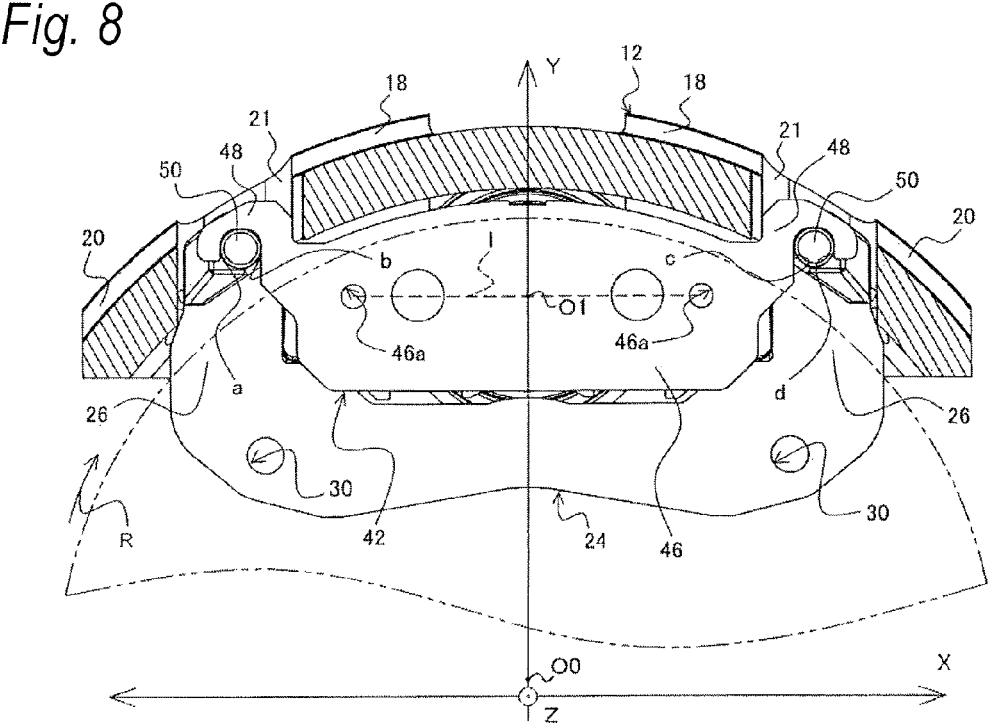
FIG. 8 is a section view taken along the B-B line in FIG. 2.
Figure 9:
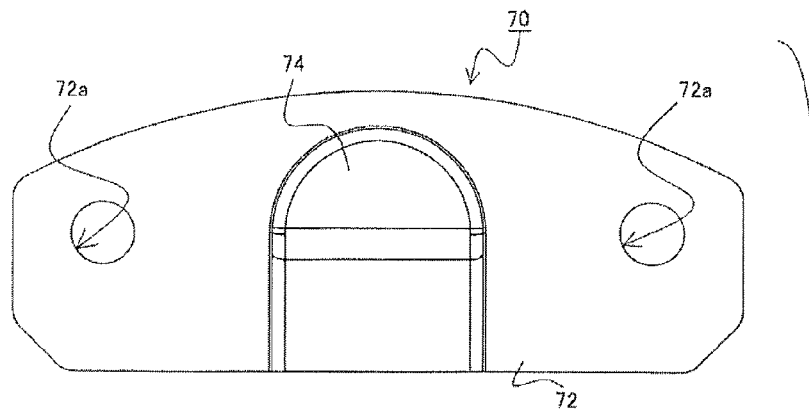
FIG. 9 is a view of a cover employable in the disk brake device of the embodiment.
Figure 9:
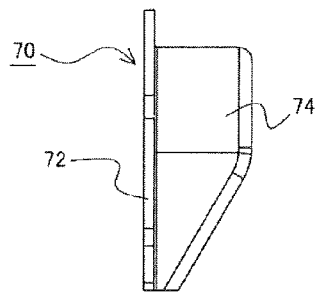
Figure 9:
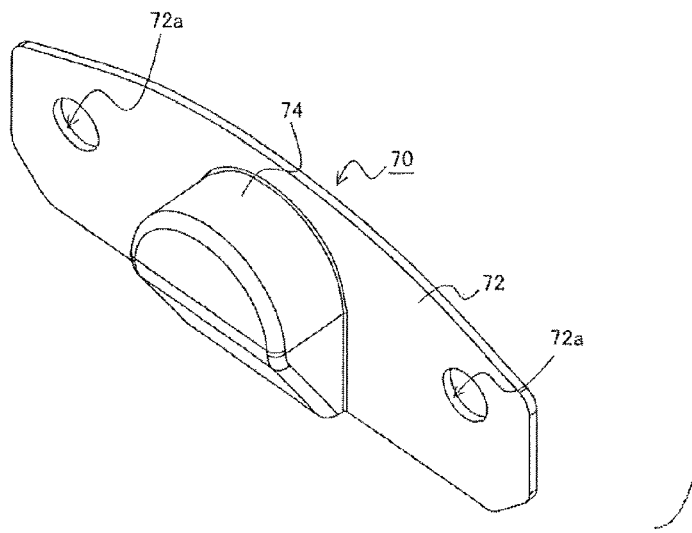

As shown in FIG. 8, the female screw holes 46a are arranged such that, in the assembled state, a straight line l connecting together the centers of the two female screw holes 46a passes near the center 01 of the cylinder arranged position of the cylinder 14b provided in the caliper body 12. With this structure, braking torque transmitted from the rotor 60 to the outer side brake pad 42 bolt-fixed to the pawl part 16 can be transmitted to the caliper body 12 (pawl part 16) without waste. That is, with respect to a tangential direction where torque is applied in braking, the integrity of the pawl part 16 and outer side brake pad 42 can be enhanced and, with these parts as part of the structure of the caliper body 12, a tangential force can be transmitted to the sleeves 50 and support 24.

The ear parts 48 formed in the pressure plate 46 may preferably be structured such that, in braking, they can be contacted with the sleeves 50. The reason for this is that, when the caliper body 12 is deflected in braking, contact of the ear parts 48 with the outer side brake pad 42 enables the sleeves 50 to serve as an anchor, thereby reducing a load applied to the center bridge 18, side bridges 20 and pawl part 16. Here, the guide pins 52 stored in the sleeves 50, as described above, respectively have a length reaching such surface of the pawl part 16 as is opposed to the rotor 60 with the cylinder 14 as its base point. Thus, when the pressure plate 46 of the outer side brake pad 42 fixed to the opposed surface of the pawl part 16 to the rotor 60 comes into contact with the sleeves 50, the guide pins 52 are situated within it. Thus, there is no fear of the sleeves 50 being damaged, for example, being recessed due to contact by the ear parts 48.

The ear parts 48 of the pressure plate 46 in the outer side brake pad 42 of the first embodiment, as shown in FIG. 8, are of a hanger type for covering the sleeves 50 from above and serve as torque receivers each including a recessed notch having an opening facing toward the radial-direction inner peripheral side of the rotor 60. With the ear parts 48 in this mode, in the ear part 48 situated on the turn-in side (I) of the rotor 60, the leading end side thereof is contacted with the sleeve 50, thereby providing a so called pull anchor state. Meanwhile, in the ear part 48 situated on the turn-out side (O) of the rotor 60, the base end side thereof is contacted with the sleeve 50, thereby providing a so called push anchor state. Also, in this mode, after the outer side brake pad 42 is assembled to the pawl part 16, the caliper body 12 can be assembled to the support 24 with the sleeves 50 disposed therein.

In the first embodiment, as shown in FIG. 8, in a plane view, an axis parallel to a straight line passing through the rotation center O0 of the rotor 60 and the center O1 (cylinder center) of the cylinder arranged position of the cylinder 14*b* is defined as a Y axis. Also, in FIG. 8, a straight line orthogonal to the Y axis is defined as an X axis and a straight line orthogonal to the X axis and parallel to the rotation axis of the rotor 60 is defined as a Z axis.

Figure 10:
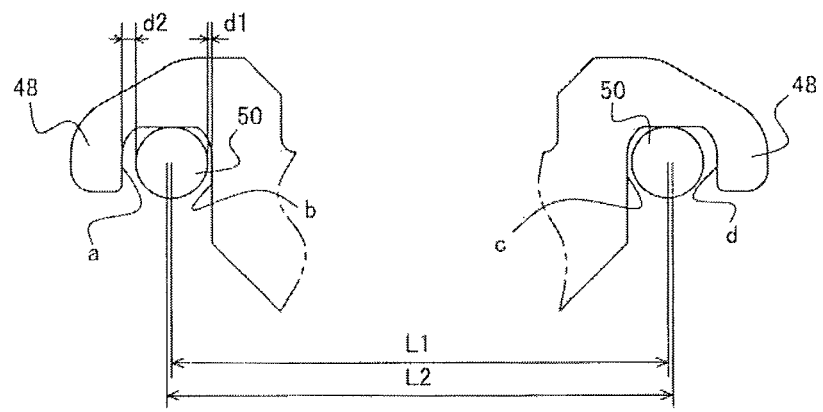
FIG. 10 explains the relationship between an ear part and a sleeve in the outer side brake pad, showing transfer from a push anchor to a push-pull anchor.
Figure 11:
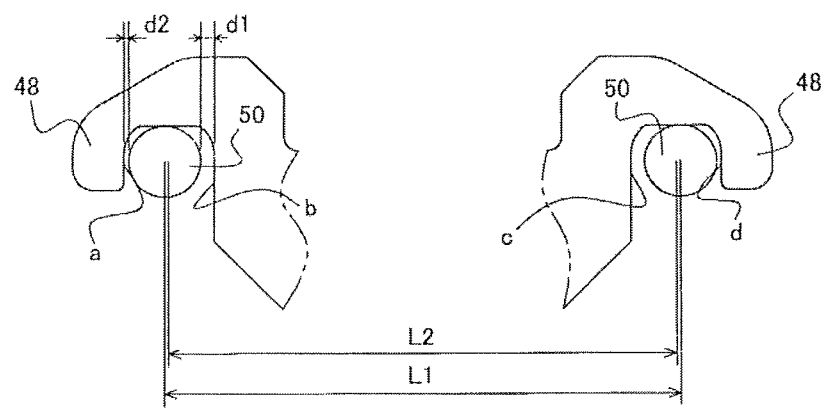
FIG. 11 explains the relationship between the ear part and sleeve in the outer side brake pad, showing transfer from a pull anchor to a pull-push anchor.

Under such environment of this embodiment, the four contact surfaces of the ear parts 48 and sleeves 50, namely, surfaces a, b, c and d are formed parallel to each other. Also, the ear parts 48 provide the torque receivers each with a recessed notch, while the opposed surfaces of the recessed notch, namely, contact surfaces a, b and contact surfaces c, d are used as torque receiving surfaces. And, the contact surfaces a-d are formed parallel to the Y axis, more specifically, a surface (YZ surface) made by the Y and Z axes. The reason for this is that, since the outer peripheral surface of the sleeve 50 is parallel to Z axis, the above structure can reduce the transmission loss of braking torque in contact. Here, when the ear parts 48 are formed in this manner, by adjusting the clearance between the ear parts 48 and sleeves 50, there can also be provided only a push anchor state, or only a pull anchor state, or, a state capable of, in early braking, providing only a push anchor (or only a pull anchor) and, in actual braking, providing a push anchor and a pull anchor (or, a pull anchor and a push anchor). FIGS. 10 and 11 respectively show the examples of the relationship between the push-pull anchor and sleeves. Here, the following description is given assuming that, as shown in FIG. 8, the rotation direction of the rotor 60 is clockwise (right-handed).

FIG. 10 shows an example where a distance L2 between the centers of the hook portions (recessed notches) of the ear parts 48 is longer than a distance L1 between the centers of the sleeves 50 (guide pins 52). With this structure, in the case of a clearance produced between the sleeve 50 and the hook section of the ear part 48, a clearance d2 produced on the end side of the pressure plate 46 is larger than a clearance d1 on the center side thereof. Thus, in the early stage of braking, when the amount of deflection of the caliper body 12 or sleeve 50 including the guide pin 52 is small, the clearance d1 between the sleeve 50 and ear part 48 disposed on the turn-out side (O) of the rotor 60 is zero and the contact surface c comes into contact with the sleeve 50, providing a push anchor state. After then, when the tangential force increases, the clearance d2 between the sleeve 50 and ear part 48 disposed on the turn-in side (I) of the rotor 60 is zero and the contact surface a comes into contact with the sleeve 50, thereby providing a pull anchor state. That is, when L1<L2, there is provided d1<d2, thereby switching the push anchor state to the push-pull anchor state.

Meanwhile, FIG. 11 shows an example where the distance L2 between the centers of the hook portions of the ear parts 48 is shorter than the distance L1 between the centers of the sleeves 50 (guide pins 52). With this structure, in the case of a clearance produced between the sleeve 50 and the hook portion of the ear part 48, the clearance d2 produced on the end side of the pressure plate 46 is smaller than the clearance d1 on the center side thereof. Thus, in the early stage of braking, when the amount of deflection of the caliper body 12 or sleeve 50 including the guide pin 52 is small, the clearance d2 between the sleeve 50 and ear part 48 disposed on the turn-in side (I) of the rotor 60 is zero and the contact surface a comes into contact with the sleeve 50, providing a pull anchor state. After then, when the tangential force increases, the clearance d1 between the sleeve 50 and ear part 48 disposed on the turn-out side (O) of the rotor 60 is zero and the contact surface c comes into contact with the sleeve 50, thereby providing a push anchor state. That is, when L1>L2, there is provided d1>d2, thereby switching the pull anchor state to the pull-push anchor state.

Here, since the description has been given assuming that the rotation direction of the rotor 60 is clockwise (right-handed), the contact surfaces to be contacted with the sleeves 50 provide the contact surfaces a and c. However, assuming that the rotation direction of the rotor 60 is counterclockwise (left-handed), the contact surfaces b and d come into contact with the sleeves 50. Also, in FIGS. 10 and 11, for promotion of understanding of explanation, clearances are shown clearly between the sleeves 50 and the respective contact surfaces a-d. Actually, the clearances between the sleeves 50 and the respective contact surfaces a-d provide states where they are in slight contact or substantially in contact, and, in braking, tangential forces are applied to the contact surfaces a-d respectively.

The rotor 60 is a rotary plate to be interposed between the inner side brake pad 34 and outer side brake pad 42 and has sliding surfaces at positions opposed to the linings 36 and 44 of the respective brake pads. The rotor 60 is fixed such that it can rotate together with a wheel (not shown).

The disk brake device 10 of the first embodiment also includes a cover 70 for covering the notch section 16*a* of the pawl part 16. The cover 70 flattens unevenness produced on the outer side surface (front surface) of the caliper body 12 to change the appearance impression of the caliper body 12.

As shown in FIGS. 9(A)~(C), the cover 70 includes a base plate 72 and a cover plate 74. The base plate 72 is used to fix the cover 70 to the caliper body 12. The base plate 72 of this embodiment is interposed between the pressure plate 46 of the outer side brake pad 42 and pawl part 16 and can be fastened together with the pressure plate 46 by a bolt 17 for fixing the pressure plate 46 to the pawl part 16. Thus, in the base plate 71, there is formed a fixing hole 72*a* for insertion of the bolt 17. This structure can prevent the cover 70 from slipping off from the caliper body 12.

The cover plate 74 provides the main part of the cover 70 and can be formed in various shapes. For example, in this embodiment, the cover plate 74 is formed to have a projection shape with respect to the base plate 72 in order to smooth a step produced by the notch section 16*a* between the pressure plate 46 and the outer side surface of the pawl part 16. And, the cover plate 74, which is formed in a projection shape along the thin portion of the pawl part 16, is also inclined such that the thickness of the projection decreases toward the inside diameter side of the rotor 60. Thus, by covering the step produced on the outer side surface of the caliper body 12 by the notch section 16*a* to change the appearance impression thereof, the design property of the disk brake device 10 can be enhanced, thereby enabling show of a so called high quality image or uniqueness.

Since the notch section 16*a* is covered by the bolt-fixable cover 70, simply by replacing the cover, a change or an accent can be given to the appearance of the caliper body 12 easily. Also, since the whole of the caliper body 12 is not covered by the cover, heat radiation property can be kept properly and thus braking performance can be maintained properly. Further, when compared with a structure for covering the whole caliper body 12, this structure is light. Thus, as a whole, this structure can contribute toward improving the fuel consumption of the vehicle.

Figure 2:
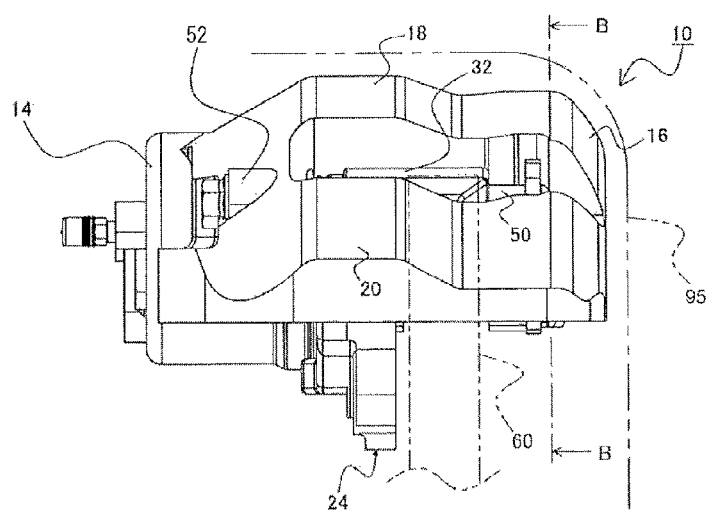
FIG. 2 is a left side view of the structure of the disk brake device according to the first embodiment of the invention.
Figure 3:
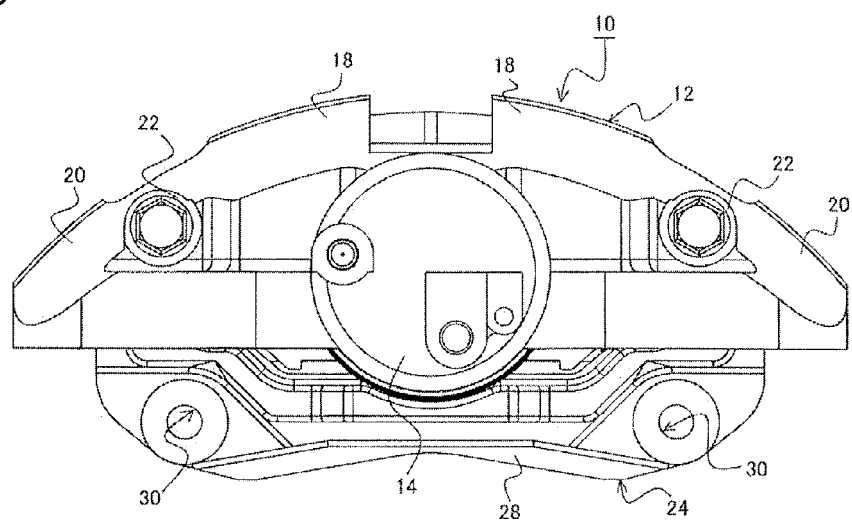
FIG. 3 is a back view of the structure of the disk brake device according to the first embodiment of the invention.
Figure 4:
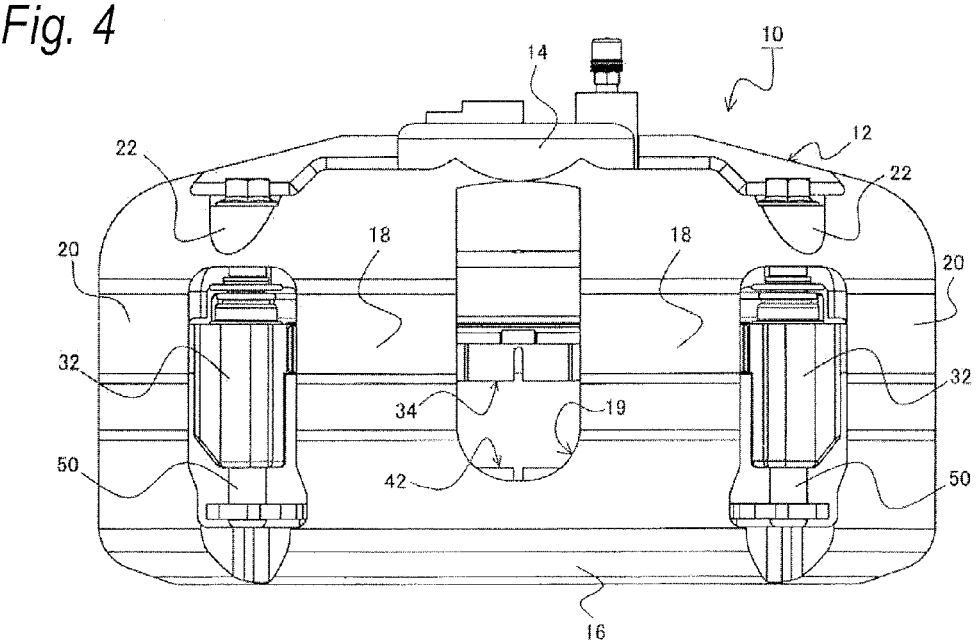
FIG. 4 is a top view of the structure of the disk brake device according to the first embodiment of the invention.
Figure 5:
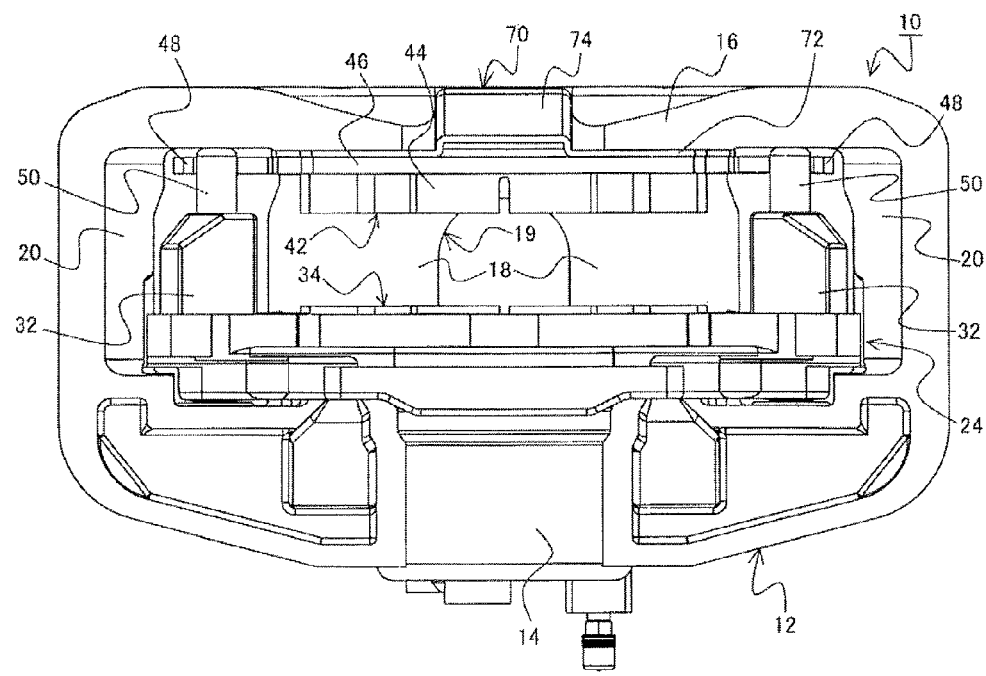
FIG. 5 is a bottom view of the structure of the disk brake device according to the first embodiment of the invention.
Figure 12:
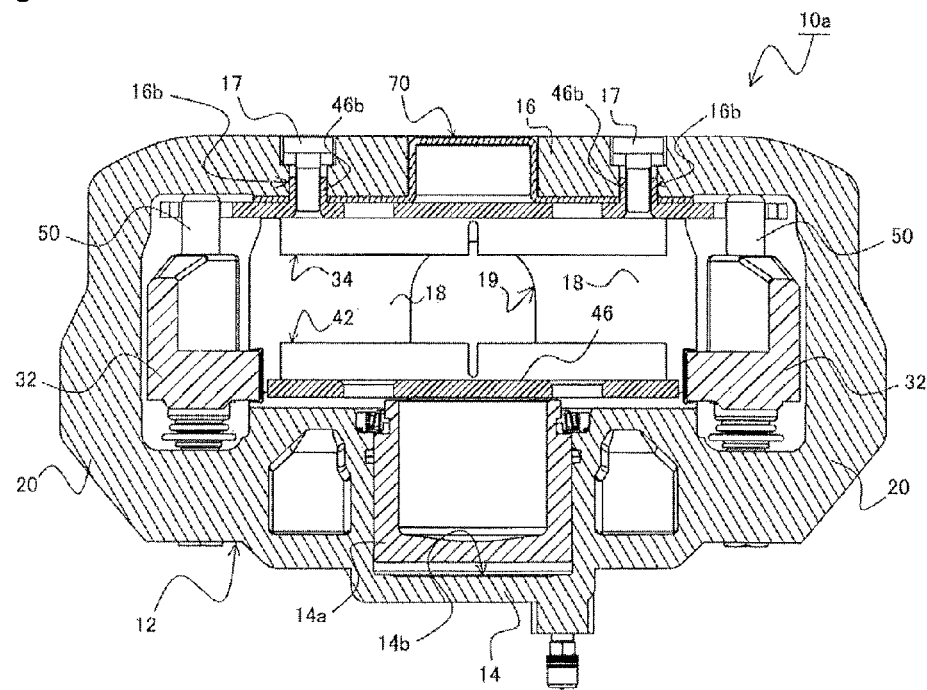
FIG. 12 is a section view of the structure of a disk brake device according to a second embodiment of the invention, taken along the C-C line in FIG. 1.
Figure 13:
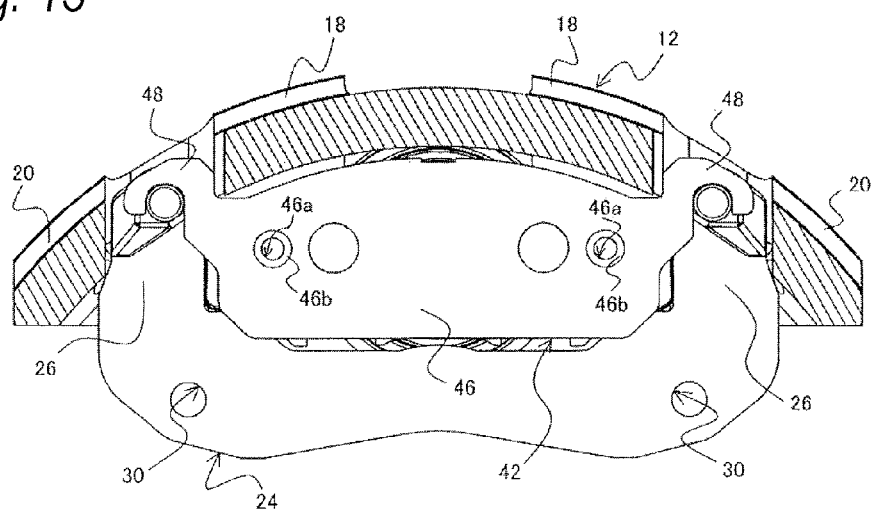
FIG. 13 is a section view of the structure of the disk brake device according to the second embodiment of the invention, taken along the B-B line in FIG. 2.

Next, description is given of a second embodiment of the disk brake device of the invention with reference to FIGS. 12 and 13. Most of the structure of the disk brake device 10a of the second embodiment is similar to the disk brake device 10 of the first embodiment. Thus, the composing elements thereof having the same structures as the first embodiment are given the same designations and the specific description thereof is omitted. In the schematic views, there are cited the reference numerals and signs used in the disk brake device 10 of the first embodiment. FIG. 12 is a section view of the characteristic structure of the disk brake device of the second embodiment and, when FIG. 1 is cited, it corresponds to the section taken along the C-C line. FIG. 13 corresponds to the section view taken along the B-B line when FIG. 2 is cited.

The disk brake device 10a of the second embodiment is different in the structure of the outer side brake pad 42 from the disk brake device 10 of the first embodiment. Specifically, in the pressure plate 46 constituting the outer side brake pad 42, there are formed bosses 46b fitted into the penetration holes 16 of the pawl part 16.

Figure 14:
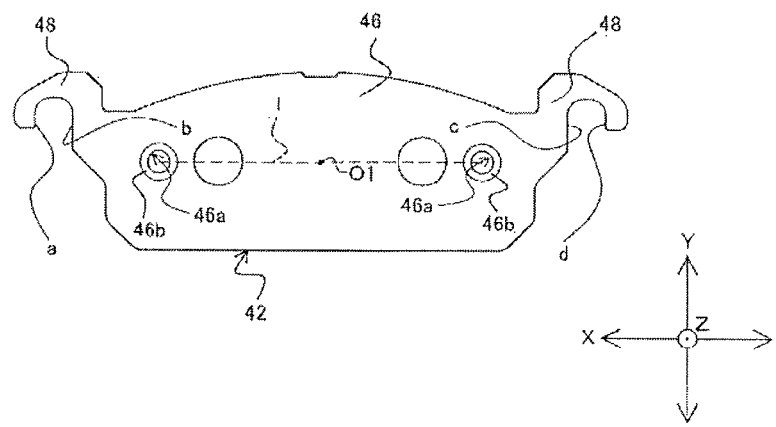
FIG. 14 is a front view of the structure of an outer side brake pad used in the disk brake device according to the second embodiment.
Figure 15:
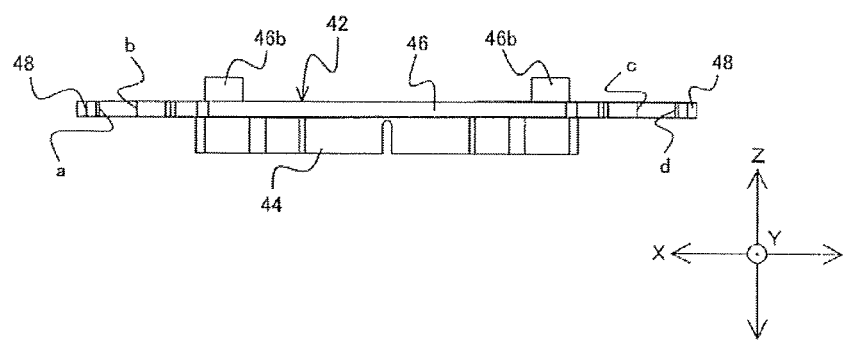
FIG. 15 is a bottom view of the structure of an outer side brake pad shown in FIG. 14.
Figure 16:
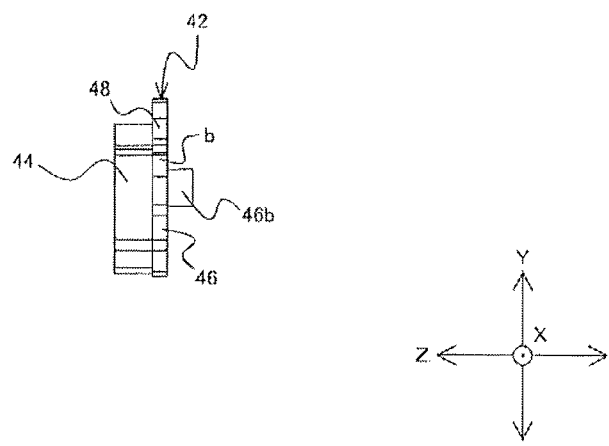
FIG. 16 is a left side view of the structure of the outer side brake pad shown in FIG. 14.

Here, referring mainly to FIGS. 14 to 16, description is given specifically of a brake pad for the disk brake device of the invention using the outer side brake pad 42.

The pressure plate 46 of the outer side brake pad 42 of the second embodiment includes a plate main body, bosses 46b and ear parts 48. The plate main body is an area on which the lining 44 can be adhered and is formed one size larger than the lining 44. The bosses 46b are projected from the other surface of the pressure plate 46 (the opposite surface of the surface with the lining 44 adhered thereon), that is, in the assembled state, the surface opposed to the pawl part 16 of the caliper body 12 (see, for example, FIGS. 1 and 2). Thus, when the pressure plate 46 is viewed from front, the bosses 46b are disposed in the range of the friction surface of the lining 44.

The bosses 46b are provided at least a pair (two) in number and, in their assembled state, when viewed from front, they are arranged not to be situated on the inner peripheral side of the cylinder 14b of the cylinder part 14 (see, for example, FIGS. 8 and 10). In other words, the paired bosses 46b are respectively arranged at positions corresponding to the pawl part 16 situated on the turn-in side (I) of the rotor 60 and the pawl part 16 on the turn-out side (O) of the rotor 60. This arrangement enables the bosses 46b to be engaged into the penetration holes 16b of the pawl parts 16, thereby providing integrity between the pawl part 16 and pressure plate 46.

Also, a straight line 1 connecting together the centers of the paired bosses 46b, when the disk brake device 10 with the outer side brake pad 42 assembled thereto is viewed from front, is parallel to a straight line passing a position overlapping with the rotation center O0 of the rotor 60 and a position overlapping with the center O1 of the cylinder arranged position of the cylinder 14b of the cylinder part 14, when an axis parallel to the plate surface of the pressure plate 46 is defined as a Y axis and an axis parallel to a straight line orthogonal to the tangential direction of the rotor 60 with respect to the Y axis is defined as an X axis, is parallel to the X axis, and passes the center O1 of the cylinder arranged position of the cylinder 14b or the vicinity thereof (see FIG. 8). Since the bosses 46b are provided in this manner, the direction of a tangential force applied to the center of pressure (actually, a portion to be pressed by the pawl part 16 receiving a reaction force opposing the pressure) given by the piston 14a overlaps with the straight line 1. Thus, with respect to a direction where the tangential force is loaded, integrity of the pawl part 16 of the caliper body 12 and outer side brake pad 42 can be enhanced, enabling transmission of the tangential force to the pawl part 16 with no loss. That is, the outer side brake pad 42 can be used as the reinforcing member of the caliper body 12. Here, "the vicinity of the center O1 of the cylinder arranged position" can be defined as the allowable range of deviation of the straight line 1 along the Y axis direction, for example, the range of the diameter of the boss 46b, or the range of the diameter or so of a female screw hole 46a to be described later.

Also, in each boss 46b, there is formed a female screw hole 46a along the projecting direction of the boss 46b (when determining an axis, an axis (Z axis) parallel to the axis of the rotor 60). Formation of the female screw hole 46a in the boss 46b enables threaded engagement of the boss 46b engaged into the penetration hole 16b of the pawl part 16 by the bolt 17, whereby the bosses can be stably fastened to the pawl part 16 (see FIG. 12). Thus, the pressure plate 46 of the outer side brake pad 42 can be regarded as a lump of structure including the pawl part 16, whereby the rigidity of the paw part 16 (caliper body 12) divided to two blocks by the notch section 16a can be enhanced with the outer side brake pad 42 (pressure plate 46) as a reinforcing member.

Also, according to this holding mode, there is eliminated the need to hold the outer side brake pad 42 by the support. This eliminates the need to form the outer side frame in the support 24, thereby enabling miniaturization of the support 24. Thus, manufacturing cost and weight can be reduced. Here, with employment of the structure for engaging the bosses 46b into the penetration holes 16b of the pawl part 16, even when the bolt 17 fastening the pawl part 16 and pressure plate 46 slips off, the outer side brake pad 42 can be prevented from slipping off from the pawl part 16. Thus, reliability in safety can also be enhanced. Also, such engagement can facilitate the positioning of the pressure plate 46 when assembling it to the pawl part 16 and can prevent erroneous recognition that assembling is completed while its position is shifted.

Figure 6:
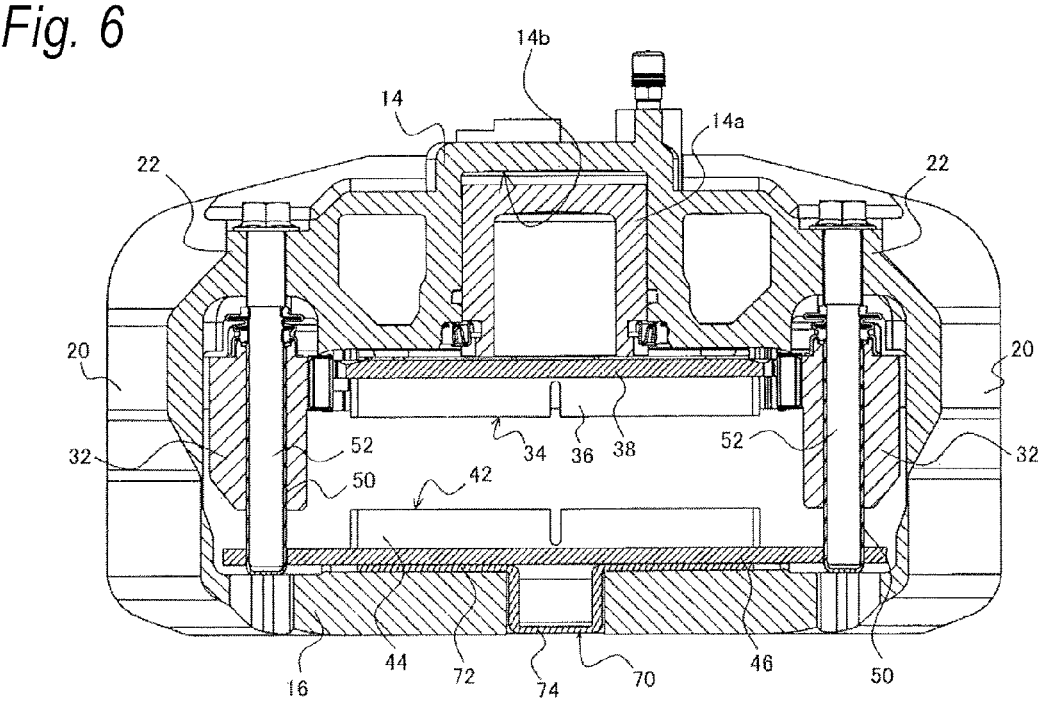
FIG. 6 is a section view taken along the A-A line in FIG. 1.
Figure 7:
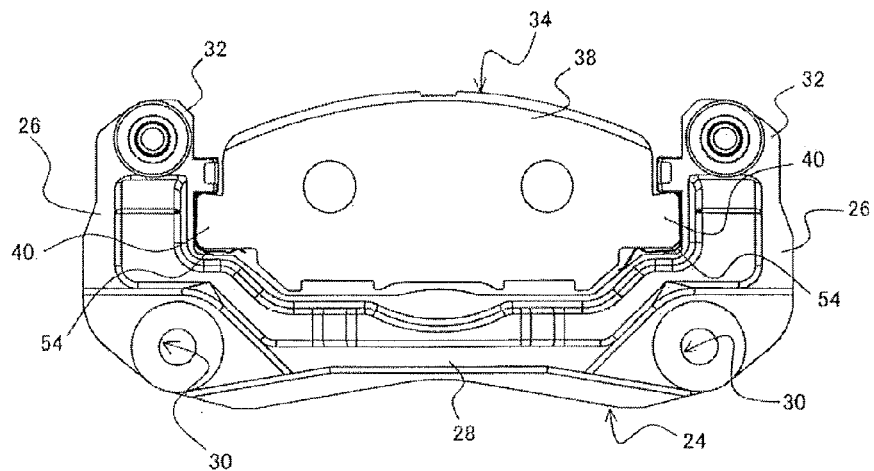
FIG. 7 is an arrangement structure of a support and an inner side brake pad with a caliper body removed.

The ear parts 48, in braking, come into contact with the guide pins 52 (in the second embodiment, sleeves 50 to be described later; see FIG. 6 and the like) and, while using the guide pins 52 and sleeves 50 as anchors, receives the tangential force. Thus, in braking, when the caliper body 12 is deflected, the ear parts 48 of the outer side brake pad 42 are contacted with the sleeves 50 to prevent the caliper body 12 against deflection. Accordingly, the tangential force in braking is transmitted to the caliper body 12 and is transmitted from the ear parts 48 serving as part of the caliper body 12 to the sleeves 50. Also, the tangential force, besides transmission from the ear parts 48 to the sleeves 50, is also transmitted directly from the caliper body 12 to the base side of the guide pins 52 connected to the support 24. This can prevent the attitude of the caliper body 12 against inclination and the lining 44 from being worn unevenly by the distorted sleeves 50 (guide pins 52).

Here, in the second embodiment, the guide pins 52 stored in the sleeves 50 have a length reaching such surface of the pawl part 16 as is opposed to the rotor 60 with the cylinder part 14 as the base point. Thus, when the pressure plate 46 of the outer side brake pad 42 fixed to the opposed surface of the pawl part 16 to the rotor 60 comes into contact with the sleeves 50, the guide pins 52 are situated within it. Thus, there is no fear of the sleeves 50 being damaged, for example, being recessed due to contact by the ear parts 48.

In the second embodiment, since the ear parts 48 are contacted with the guide pints 52 or the sleeves 50 for covering the guide pins 52, it is premised that the guide pins 52 (sleeves 50) are assembled to the disk brake device 10 (10*a*) to be disposed on the outer peripheral side of the rotor 60. Thus, the ear parts 48 serving as the torque receivers of the pressure plate 46 are disposed respectively on the turn-in side (I) and turn-out side (O) of the rotor 60 at positions providing the outer periphery side with respect to the outside diameter of the rotor 60. Meanwhile, the bosses 46*b* are disposed on the inner peripheral side with respect to the outside diameter of the rotor 60. Here, as disclosed in the patent document 7, there is available a disk brake device including guide pins which, after a support straddles a rotor, are provided on the inner peripheral side of the rotor outside diameter and are projected toward the rotor. However, in this type of disk brake device, the weight of the support is increased, and guide pins must be provided on the inner side and outer side of the rotor, thereby increasing the number of parts. Therefore, such disk brake device 10*a* as the second embodiment may preferably be employed.

Also, where brake torque to be applied to the torque receiver of the pressure plate 46 is expressed by τ[N·m], it can be expressed by τ=(radius r)×(tangential force F). Thus, by disposing the ear parts 48 serving as the torque receiver of the pressure plate 46 on the outer peripheral side of the outside diameter of the rotor 60, when compared with a structure for disposing them on the inner peripheral side, r can be increased and the force in the tangential direction (tangential force) F can be reduced. Accordingly, by disposing the ear parts 48 serving as the torque receiver of the pressure plate 46 on the brake pad situated nearer to the outer peripheral side than the outside diameter of the rotor 60, the load to be applied to the guide pins 52 and sleeves 50 can be reduced.

Here, also when there is employed the pressure plate 46 with the bosses 46*b* provided thereon, it is fixed to the pawl part 16 through the bolt 17; and thus, by providing, on the opposed surfaces of the pressure plate 46 to the pawl parts 16, the bosses 46*b* fitted into the penetration holes 16*b*, even when the bolt 17 for fixing the outer side brake pad 42 slip off, there is no fear of the outer side brake pad 42 dropping down.

Thus, the disk brake device 10*a* of the second embodiment is more reliable in safety than the disk brake device 10 of the first embodiment.

Figure 17:
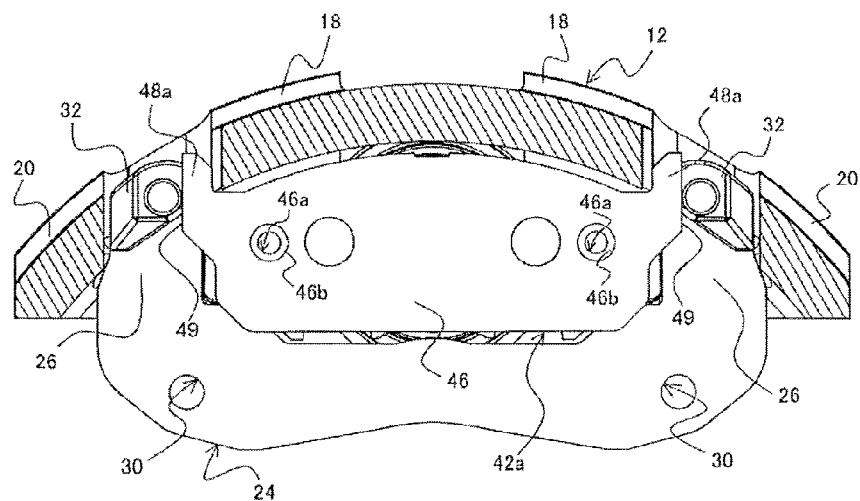
FIG. 17 is an explanatory view of an applied example of an outer side brake pad applicable to the disk brake device according to the second embodiment of the invention.

Next, description is given of the outer side brake pad applicable to the above embodiments with reference to FIG. 17. An outer side brake pad 42*a* of this embodiment is different in the structure of the ear parts 48 from the outer side brake pad 42 described in the above respective embodiments. The ear parts 48 of the outer side brake pad 42 of the above respective embodiments are of a hanger type, whereas the ear parts 48*a* of the outer side brake pad 42*a* of this embodiment provide contact surfaces 49 cut down linearly, providing a simplified structure. Here, the contact surfaces 49 of the ear parts 48*a*, similarly to the above respective embodiments, are parallel to the Y axis, more specifically, a plane (YZ plane) constituted of Y and Z axes.

Even when the ear parts 48*a* of the outer side brake pad 42*a* are structured in this manner, due to provision of the contact surfaces 49 with respect to the sleeves 50, in braking, an anchor effect by the sleeves 50 can be obtained. However, since the ear parts 48*a* of this embodiment provide the cut-down contact surfaces 49, an anchor effect by a so called pull anchor cannot be obtained. Thus, the anchor effect is provided only by a push anchor with respect to the sleeve 50 situated on the turn-out side (O) of the rotor 60. Here, use of the thus structured pressure plate 46 can enhance blanking performance when compared with those of the above respective embodiments. Thus, material cost and weight can be reduced. And, simplified outer shape can also reduce working cost.

Figure 18:
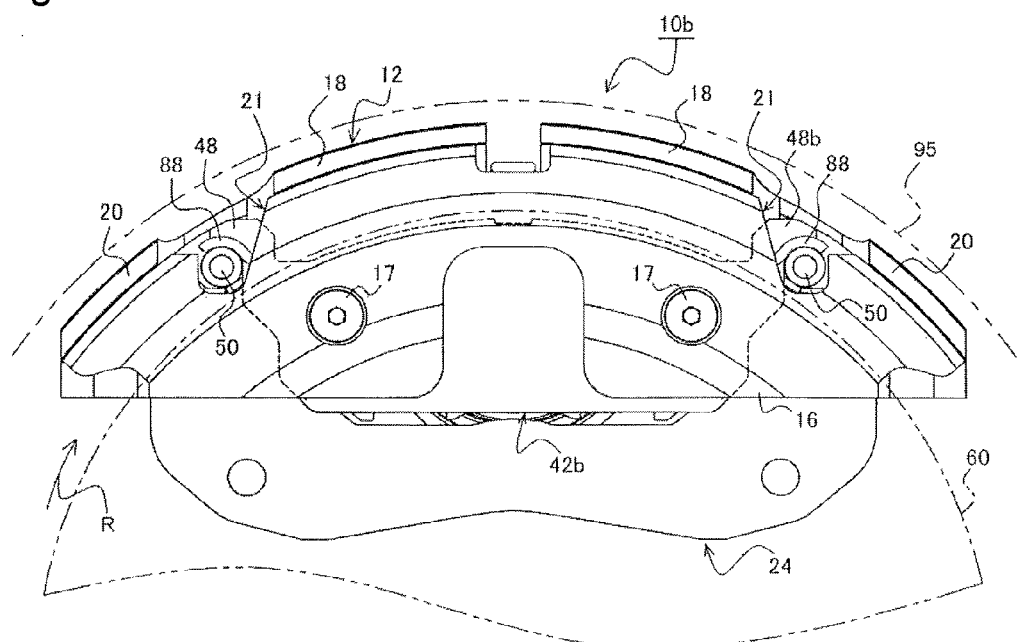
FIG. 18 is a front view of a disk brake device of a type using a part of a caliper body as an anchoring element.
Figure 19:
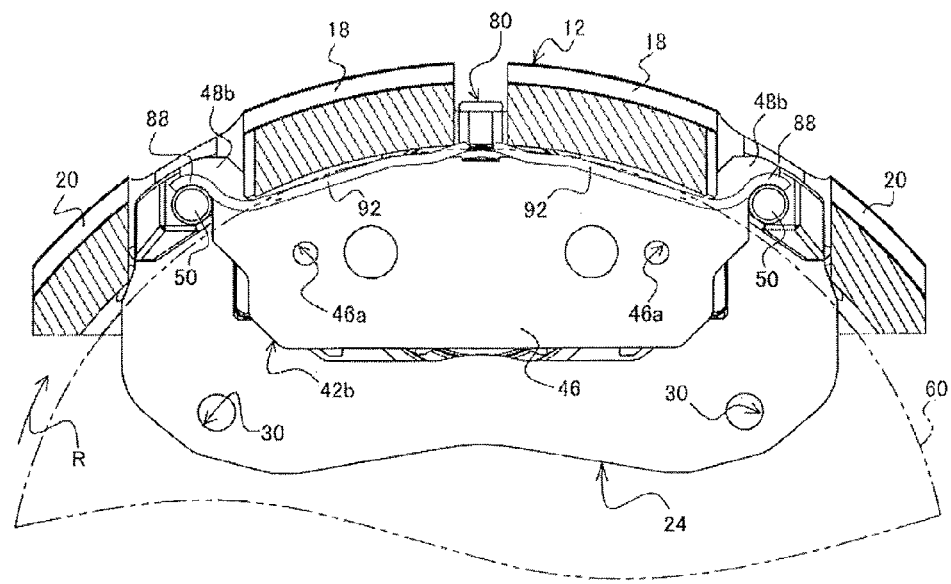
FIG. 19 is a section view of FIG. 18, corresponding to the B-B section in FIG. 2.

Next, description is given of a disk brake device 10*b* which can provide both pull and push anchor effects by using the outer side brake pad 42*a* including such linearly cut-down type ear parts 48*a* as shown in FIG. 17, or the outer side brake pad 42*b* including such ear parts 48*b* not of a hanger type as shown in FIGS. 18 and 19.

In this embodiment, a pawl part 16 integrally fixed through bolts 17 to an outer side brake pad 42*b* is used as a torque receiving element. Other structures and operations are similar to the above embodiments. Therefore, parts having the same structures are given the same designations and thus the specific description thereof is omitted here.

The specifically difference between the brake device 10, 10*a* of the above embodiments and the disk brake device of this embodiment is in the structure of notch sections 21 from the above embodiments. In the caliper body 12 in the disk brake device 10, 10*a* of the above embodiments, the notch sections 21 are formed in such a manner to avoid interference between the caliper body 12 and sleeves 50. Meanwhile, in the disk brake device 10*b* of this embodiment, of the notch sections 21 formed in the caliper body 12, the side walls of the pawl part 16 situated on the side bridges 20 side have contact surfaces e and f (see FIG. 20).

Figure 20:
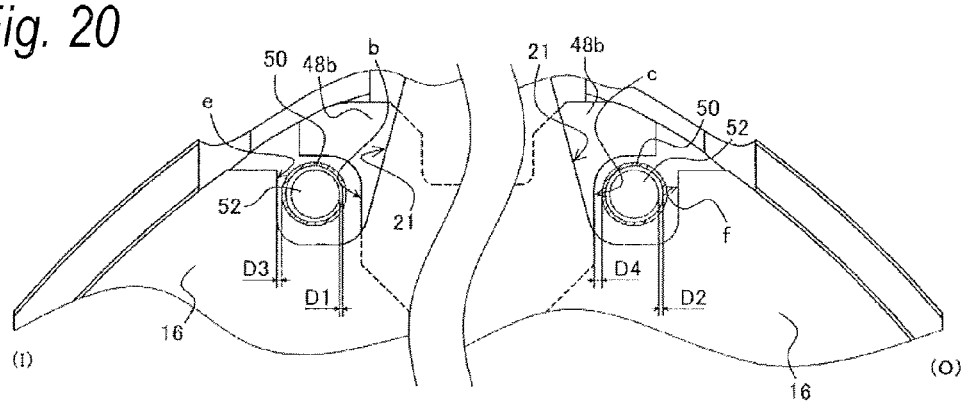
FIG. 20 is a view of the arrangement of a caliper body, sleeves and guide pins when not in braking.

In this structure, on the turn-in side (I) of the rotor 60, the contact surface e of the notch section 21 is contacted with the sleeve 50 to provide a pull anchor, whereas, on the turn-out (O) side of the rotor 60, the contact surface c of the ear part 48*b* of the pressure plate 46 is contacted with the sleeve 50 to provide a push anchor (see FIG. 20). Also, as described above, when compared with the ear parts 48*b* of a hanger type, blanking performance can be enhanced and material cost, weight and working cost can be reduced. Also, since a pull anchor effect is provided with part of the caliper body 12 fastened to the pressure plate 46 as an anchor element, there is eliminated the need to employ a hanger type of ear part with its plate width spread. Thus, even when a clearance with respect to the wheel inner wall 95 is narrow, a pull anchor on the turn-in side (I) of the rotor 60 can be realized. Further, when, to provide the contact surfaces e and f on the notch sections 21, these portions are formed in projection shapes, the opening areas of the notch sections 21 can be reduced. Thus, the rigidity of the caliper body 12 can be enhanced.

In the disk brake device 10*b* having this characteristic structure, the contact surfaces e and f in the caliper body 12 can be worked by inserting a cutting tool from the radial direction of the rotor 60 and sliding the cutting tool in the axial direction. Between the center bridge 18 and side bridges 20 in the caliper body 12, there are formed the notch sections 21. Thus, the cutting tool can be inserted using the notch sections 21.

In the disk brake device 10*b* of this embodiment, clearances between the contact surfaces and sleeves 50 are determined as shown in FIG. 20. That is, when the rotation direction of the rotor 60 is clockwise (in the drawings, rotation from right to left), a clearance D3 between the contact surface e of the turn-in side (I) notch section 21 and sleeve 50 is determined to be smaller than a clearance D4 between the contact surface c of the turn-out side (O) ear part 48*b* and sleeve 50. Also, in the disk brake device 10*b* of this embodiment, clearances D1 and D2 between the sleeves 50 and guide pins 52 are defined in design such that D2>D1. Here, in FIGS. 20 to 24, for easy understanding of explanation, the clearances D1 to D4 between the composing parts are shown larger than actually and the guide pins 52 are shown such that they are floating within the sleeves 50. In this setting, in braking, torque reception is performed in the following manner.

Figure 21:
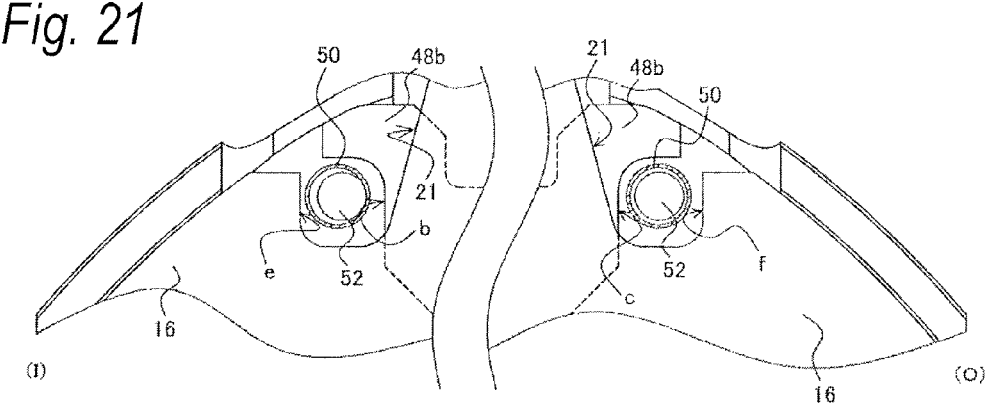
FIG. 21 is a view of the operations of the caliper body, sleeves and guide pins in the early stage of braking, showing a state where the guide pin on the rotor turn-in side is contacted with the inner wall of its associated sleeve.
Figure 22:
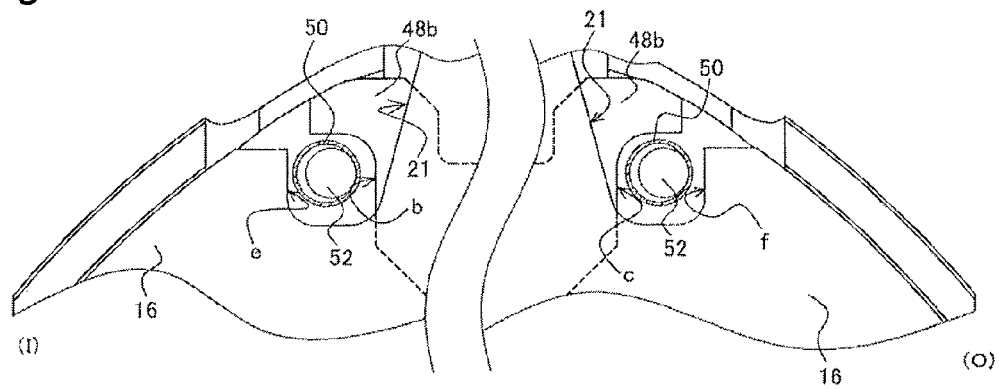
FIG. 22 is a view of the operations of the caliper body, sleeves and guide pins in the early stage of braking, showing a state where guide pins on the rotor turn-in and rotor turn-out sides are contacted with the inner walls of their associated sleeves.
Figure 23:
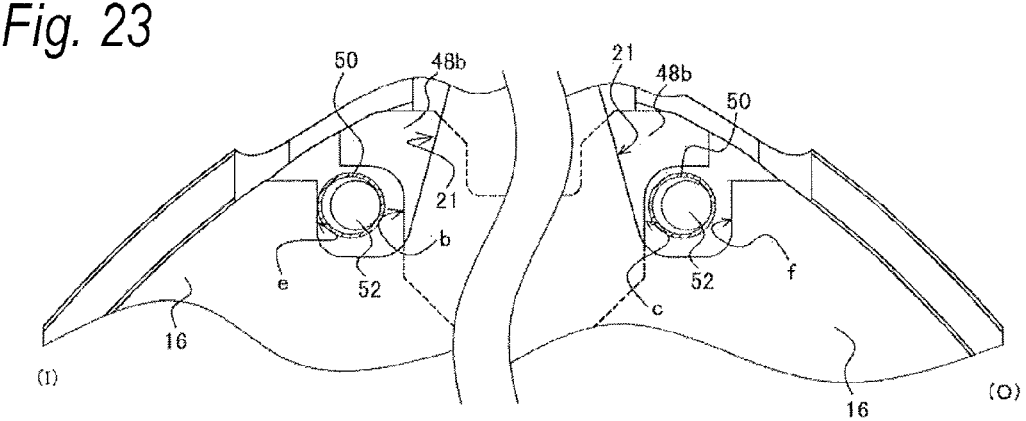
FIG. 23 is a view of the operations of the caliper body and sleeves in braking, showing a state where a contact surface e formed in a notch section on the rotor turn-in side is contacted with the outer peripheral surface of its associated sleeve.
Figure 24:
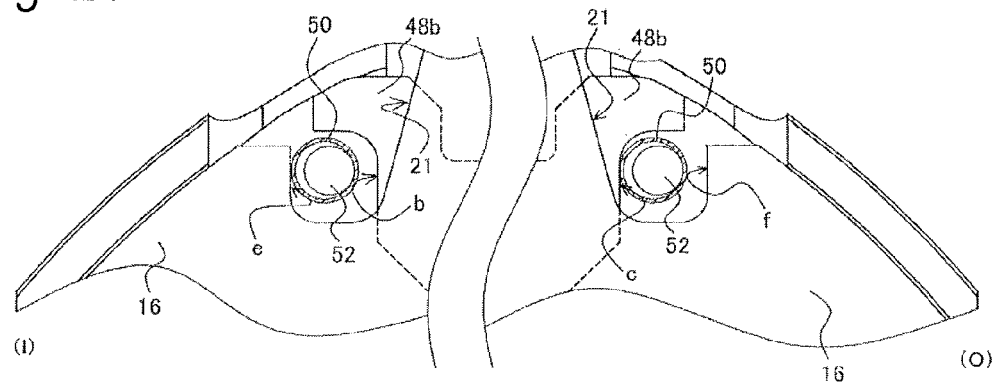
FIG. 24 is a view of the operations of the caliper body and sleeves in braking, showing a state where a contact surface e formed in a notch section on the rotor turn-in side is contacted with the outer peripheral surface of its associated sleeve and a contact surface c formed in an ear part on the turn-out side in the outer side brake pad is contacted with the outer peripheral surface of its associated sleeve.

Firstly, in the early stage of braking, the caliper body 12 is shifted in the rotation direction of the rotor 60 relative to the sleeves 50 fixed to the support 24. Thus, as shown in FIG. 21, within the sleeve 50 disposed on the turn-in side (I) of the rotor 60, the guide pin 52 is contacted with the turn-out side inner peripheral surface (pull anchor: clearance D1=0). Next, as shown in FIG. 22, within the sleeve 50 on the turn-out side (O) of the rotor 60, the guide pin 52 is contacted with the turn-out side inner peripheral surface (push anchor: clearance D2=0). This operation is performed instantaneously and, after then, anchoring is executed through the caliper body 12 and pressure plate 46. That is, as shown in FIG. 23, on the turn-in side (I) of the rotor 60, the contact surface e of the notch part 21 is contacted with the turn-in side outer surface of the sleeve 50 (pull anchor: clearance D3=0). When the braking torque increases further, as shown in FIG. 24, on the turn-out side (O) of the rotor 60, the contact surface c of the ear part 48b of the pressure plate 46 is contacted with the turn-in side outer surface of the sleeve 50 (push anchor: clearance D4=0).

Also, to the disk brake device 10b of this embodiment, there is assembled an anti-rattle spring.

Figure 25:
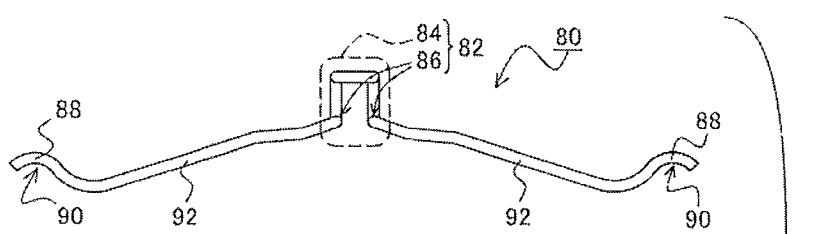
FIG. 25 shows an embodiment of an anti-rattle spring used in the disk brake device according to the embodiment shown in FIGS. 18 and 19; and, specifically.
Figure 25:
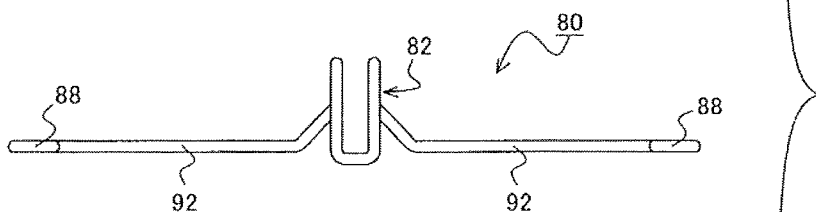
Figure 25:
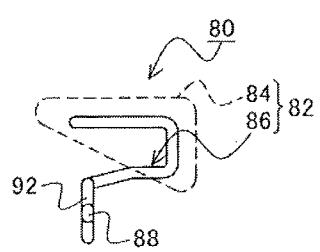

The anti-rattle spring is an element to prevent the caliper body 12 from falling down to thereby stabilize the attitude thereof (radial-direction positioning element). The anti-rattle spring 80, for example, as shown in FIGS. 25 (A) to (C), includes a caliper side engaging part 82 and a sleeve side engaging part 88, both of which are connected together by a spring part 92. Here, FIG. 25(A) is a front view of the anti-rattle spring 80, FIG. 25(B) is a plane view, and FIG. 25(C) is a right side view.

In the anti-rattle spring 80 of FIG. 25, the caliper side engaging part 82 includes a clip section 84 and a loading point 86. The clip section 84 is an element which holds part of the caliper body 12 (in FIG. 18, holds the thickness-reduced section of the back thickness portion constituting the penetration hole 19 of the center bridge 18) to stably hold the whole the anti-rattle spring 80 on the caliper body 12. The loading point 86 of the caliper side engaging part 82 comes into contact with the inner peripheral side of the caliper body 12 and applies a load in a direction to raise the caliper body 12 (a direction going toward the radial-direction outer peripheral side of the rotor 60).

Meanwhile, the sleeve side engaging part 88 is enough to have a loading point 90 contactable with the sleeve 50. The loading point 90 of the sleeve side engaging part 88 applies a load in a direction to push down the sleeve 50 (a direction toward the radial-direction inner periphery of the rotor).

Due to application of the above loads by the loading points 86 and 90, the caliper body 12 is pushed up on the pawl part 16 side with the sleeves 50 as the base points, thereby enabling stabilization of the attitude thereof. This can prevent useless oscillation of the caliper body 12 while not in braking or the like, thereby preventing rattle sounds. Also in braking as well, the operation of the caliper body 12 can be stabilized, thereby providing a stable braking force.

Figure 26:
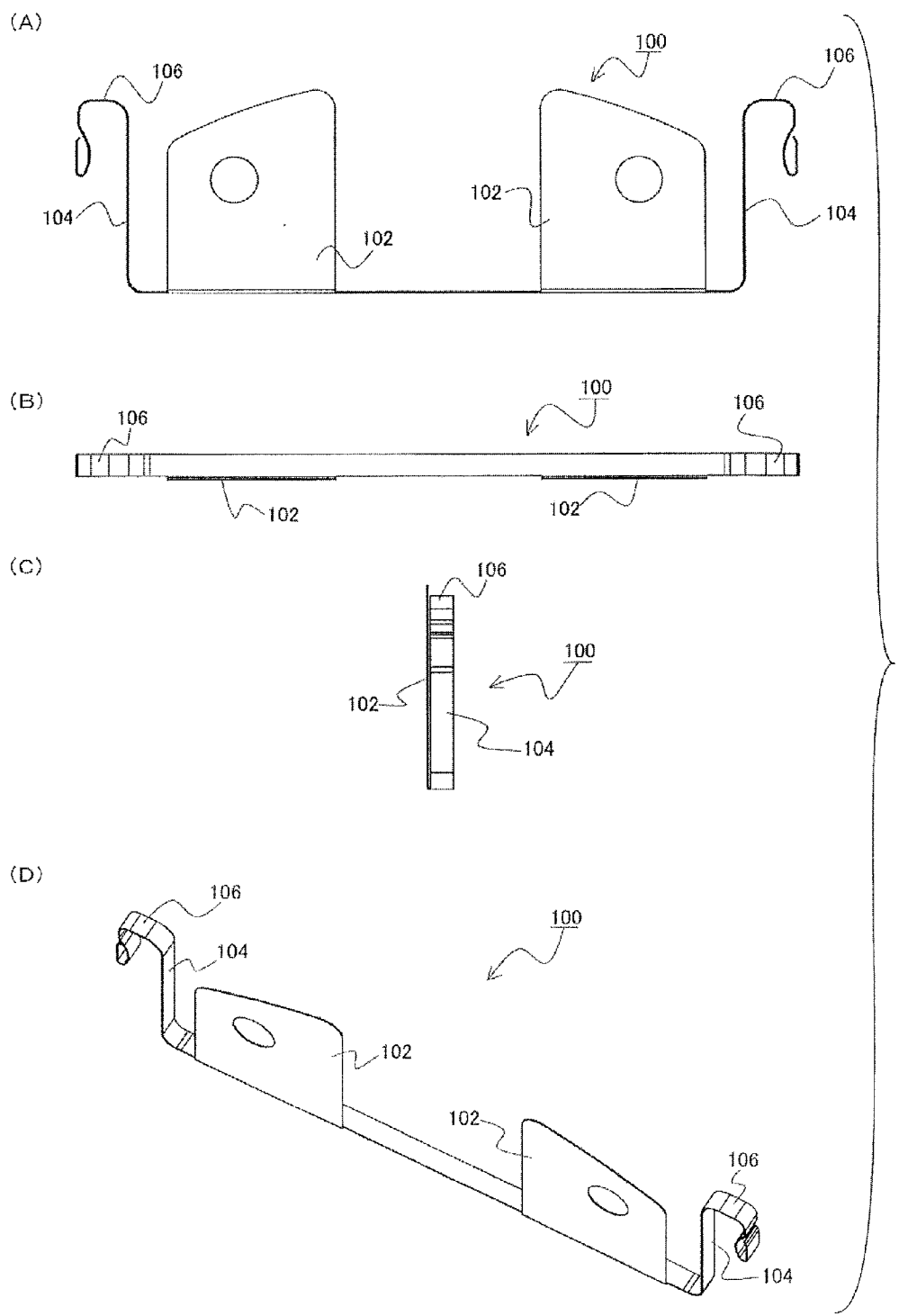
FIG. 26 shows an example of a specific structure of a pad clip applicable to the disk brake device of the invention; and, specifically.

The disk brake device 10b of this embodiment may also include such a pad clip as shown in FIGS. 26 (A) to (D).

Here, FIG. 26 (A) is a front view of the pad clip, FIG. 26(B) is a plan view, FIG. 26(C) is a right side surface, and FIG. 26(D) is a perspective view.

The pad clip 100 is an element for controlling an outer side brake pad 42b (including the caliper body 12 fastened to the outer side brake pad 42b) so as to be situated, in the circumferential direction of the rotor 60, centrally between the sleeves 50 serving as torque receivers (circumferential-direction positioning element), and is also an element for preventing covered parts against wear and abrasion.

In a specific example, the pad clip 100 includes a main body plate 102 and a cover plate 106, both of which are connected together by a spring member 104. In the pad clip 100 shown in FIGS. 26 (A) to (D), the main body plate 102 is interposed between the pawl part 16 and pressure plate 46. With this structure, the outer side brake pad 42b is fastened to the pawl part 16 by the bolt 17 to thereby position the pad clip 100.

The cover plate 106 has a hanger type shape and is disposed to cover the outer peripheral surface of the sleeve 50 from the outer peripheral side of the rotor 60. This structure can prevent the ear part 48a and the outer peripheral portion of the sleeve 50 from coming into contact with each other. Thus, electric erosion between different metal parts and wear and abrasion due to sliding motion or shocks in braking can be prevented. The outer side brake pad 42b interposed between the two sleeves 50 can be positioned in the circumferential direction by the spring member 104. Thus, the circumferential direction position of the caliper body 12 united with the outer side brake pad 42b can also be stabilized.

Here, the characteristics of the disk brake device and the brake pad for the disk brake device of the embodiments of the invention are briefly listed below.

[1] A disk brake device 10, comprising:

a caliper body 12 including a cylinder part 14 which is disposed on an inner side of a rotor 60, a pawl part 16 which is disposed on an outer side of the rotor 60 and has an inner peripheral side notch section (notch section) 16a at a position opposed to a cylinder arranged position and outer side notch sections (notch section) 21, wherein the cylinder part 14 and the pawl part 16 are connected together by a center bridge 18 and side bridges 20 respectively disposed on a turn-in side (I) and a turn-out (O) side of the rotor 60 with the center bridges 18 as base points, and the outer side notch sections (notch section) 21 are respectively interposed between the center bridges 18 and the side bridges 20;

a support 24 including guide pin guiding parts 32 exposed to an outside of the caliper body from the outer peripheral side notch sections (notch section) 21 and disposed in a range of a thickness of a back part of the caliper body constituting the center bridge 18 and side bridges 20, the guide pin guiding parts 32 being interposed between the cylinder part 14 and pawl part 16;

guide pins 52 slidable with respect to the guide pin guiding parts 32 of the support 24; and an inner side brake pad 34 and an outer side brake pad 42 respectively disposed on the inner side and outer side of the rotor 60, wherein the outer side brake pad 42 is threadedly engaged with such a surface of the pawl part 16 opposed to the rotor 60 on the turn-in side (I) and the turn-out side (O) of the rotor 60 with respect to the inner peripheral side notch section (notch section) 16a.

[2] The disk brake device 10 having the [1] structure, wherein each of the guide pin guiding parts 32 includes a sleeve 50 made of a member having similar strength to the guide pin 52, and the guide pin 52 slides on the inner peripheral side of the sleeve 50.

[3] The disk brake device 10 having the [2] structure, wherein the guide pin 52 has a length so as to reach the opposed surface of the pawl part 16 to the rotor 60 within the sleeve 50, and the outer side brake pad 42 includes a friction member (lining) 44 and a pressure plate 46 threadedly engageable with the pawl part 16, the pressure plate 46 including an ear part 48 contactable with the sleeve 50 in braking.

[4] The disk brake device 10a having the [3] structure, wherein the ear part 48a includes a contact surface 49 with respect to the sleeve 50 situated on the turn-out side (O) of the rotor 60.

[5] The disk brake device 10b having the [4] structure, wherein the outer peripheral side notch section (notch section) 21 includes, on the side wall thereof on a side of the side bridges 20 situated on the turn-in side (I) of the rotor 60, contact surfaces e and f contactable with the sleeves 50.

[6] The disk brake device 10 having the [3] structure, wherein the ear part 48 has contact surfaces a, b, c and d with respect to the sleeves 50 situated on both of the turn-in side (I) and turn-out side (O) of the rotor 60.

[7] The disk brake device 10 having any one of the [4]-[6] structures, wherein, where an axis parallel to a straight line passing the rotation center O0 of the rotor 60 and the center O1 of the cylinder arranged position is defined as a Y axis, two or four of the contact surfaces a, b, c and d with respect to the sleeves 50 are parallel to each other and are parallel to the Y axis.

[8] The disk brake device 10a having any one of the [3]-[7] structures, wherein, a surface of the pressure plate 46 opposed to the pawl part 16 are provided with bosses 46b configured to be fitted into penetration holes 16b formed for threaded engagement.

[9] The disk brake device 10b having any one of the [2]-[8] structures, wherein, an anti-rattle spring 80 is interposed between the caliper body 12 and sleeve 50.

[10] The disk brake device 10b having any one of the [3]-[9] structures, further comprising a pad clip 100 including:

a cover plate 106 for covering at least one of the contact portions of the sleeves 50 with the outer side brake pad 42b and with the caliper body 12; and a main body plate 102 interposed between the pressure plate 46 and the pawl part 16, wherein the cover plate 106 and the main body plate 102 are connected together by a spring member 104.

[11] The disk brake device 10 having any one of the [1]-[10] structures, further comprising a cover 70 for filling a step between the inner peripheral side notch section (notch section) 16a and the pawl part 16.

[12] The disk brake device 10 having the [11] structure, wherein the cover 70 includes:

a base plate 72 interposed between the pawl plate 16 and a pressure plate 46 of the outer side brake pad 42; and a cover plate 74 exposed to the outer side through the inner peripheral side notch section (notch section) 16a of the pawl part 16.

[13] The disk brake device 10 having the [12] structure, wherein the base plate 72 has a fixing hole 72a capable of fastening itself to the pawl part 16 together with the outer side brake pad 42.

[14] A brake pad (outer side brake pad) 42 for a disk brake device, comprising:

a friction member (lining) 44; and a pressure plate 46 to which the friction member (lining) 44 is adhered, wherein the pressure plate 46 includes at least two bosses 46b projecting from a surface opposed to a surface to which the friction member (lining) 44 is adhered, and torque receiving parts (ear parts) 48 respectively disposed on the turn-in side (I) and turn-out side (O) of the rotor 60, and female screw holes 46a for fixing the pressure plate 46 to the caliper body 12 are formed along the projecting direction of the bosses 46b in the boss 46b projecting surfaces.

[15] A brake pad (outer side brake pad) 42 for a disk brake device having the [14] structure, wherein the boss 46b is disposed at a position existing on the inner peripheral side relative to the outside diameter of the rotor 60, and the torque receiving part (ear part) 48 is disposed at a position existing on the outer peripheral side relative to the outside diameter of the rotor 60.

[16] A brake pad (outer side brake pad) 42 for a disk brake device having the [15] structure, wherein a straight line l connecting together the centers of the paired bosses 46b is parallel to a straight line extending along the loading direction of the tangential force applied in braking and, is situated at a position passing a position the cylinder center O1 (center of cylinder arranged position) of the caliper body 12 or the vicinity thereof when viewed from front in the assembled state.

[17] A brake pad (outer side brake pad) 42 for a disk brake device having the [16] structure, wherein the torque receiving parts (ear parts) 48 each include a recess-shaped notch having an opening in the inner peripheral direction of the rotor 60, and the opposed surfaces (contact surfaces) a, b, c and d of the recess-shaped notches are used as torque receiving surfaces.

[18] A brake pad (outer side brake pad) 42 for a disk brake device having the [17] structure, wherein the opposed surfaces (contact surfaces) a, b, c and d of the recess-shaped notches are parallel to each other and are parallel to a Y axis providing a straight line parallel to a straight line passing a position overlapping with the cylinder center (center of the cylinder arranged position) O1 and a position overlapping with the rotation center O0 of the rotor 60.

Here, the disk brake device and brake pad for disk brake device of the invention are not limited to the above embodiments but can be changed or improved properly. Also, the materials, shapes, dimensions, number, arranging positions and the like of the respective composing elements of the above embodiments are arbitrary and not limitative so long as they can attain the invention.

The present application is based on Japanese Patent Application (No. 2012-236574) filed on Oct. 26, 2012, Japanese Patent Application (No. 2012-236577) filed on Oct. 26, 2012 and Japanese Patent Application (No. 2013-194028) filed on Sep. 19, 2013 and thus the contents thereof are incorporated herein by way of reference.

INDUSTRIAL APPLICABILITY

The above-structured disk brake device can provide a disk brake device which, while reducing weight, can maintain proper rigidity and can be mounted into a narrow wheel space.

Also, the above disk brake for a disk brake device, while realizing weight reduction, can secure the stable attitude of a caliper body in braking and can prevent a friction member against uneven wearing.

REFERENCE SIGNS LIST 10, 10a, 10b: disk brake device
12: Caliper body
14: cylinder part,
14a: piston
14b: cylinder
16: pawl part
16a: notch section (inner peripheral side notch section)
16b: penetration hole
17: bolt
18: center bridge
19: penetration hole
20: side bridge
21: notch section (outer peripheral side notch section)
22: guide pin assembling section
24: support
26: anchor
28: bridge
30: mounting hole
32: guide pin guiding part
34: inner side brake pad
36: lining
38: pressure plate
40: ear part
42, 42a, 42b: outer side brake pad
44: line (friction member)
46: pressure plate
46a: female screw hole
46b: boss
48, 48a, 48b: ear part
50: sleeve
52: guide pin
54: pad clip
60: rotor
70: cover
72: base plate
72a: fixing hole
74: cover plate
80: anti-rattle spring
82: caliper side engaging part
84: clip part
86: loading point
88: sleeve side engaging part
90: loading point
92: spring part
100: pad clip
102: main body plate
104: spring member
106: cover plate.

The invention claimed is:

1. A disk brake device, comprising:
a caliper body including a cylinder part which is disposed on an inner side of a rotor, a pawl part which is disposed on an outer side of the rotor and has an inner peripheral side notch section at a position directly aligned with and opposed to a cylinder arranged position and outer side notch sections, wherein the cylinder part and the pawl part are connected together by a center bridge and side bridges respectively disposed on a turn-in side and a turn-out side of the rotor with the center bridges as base points thereof, and the outer side notch sections are respectively interposed between the center bridges and the side bridges;
a support including guide pin guiding parts exposed to an outside of the caliper body from the outer peripheral side notch sections and disposed in a range of a thickness of a back part of the caliper body constituting the center bridges and the side bridges, the guide pin guiding parts being interposed between the cylinder part and the pawl part;
guide pins slidable with respect to the guide pin guiding parts of the support; and
an inner side brake pad and an outer side brake pad respectively disposed on the inner side and outer side of the rotor,
wherein the outer side brake pad is threadedly engaged with such a surface of the pawl part opposed to the rotor on the turn-in side and the turn-out side of the rotor with respect to the inner peripheral side notch section.

2. The disk brake device according to claim 1, wherein each of the guide pin guiding parts includes a sleeve made of a member having similar strength to the guide pin, and
the guide pin slides on the inner peripheral side of the sleeve.

3. The disk brake device according to claim 2, wherein the guide pin has a length so as to reach the opposed surface of the pawl part to the rotor within the sleeve, and
the outer side brake pad includes a friction member and a pressure plate threadedly engageable with the pawl part, and the pressure plate includes an ear part contactable with the sleeve in braking.

4. The disk brake device according to claim 3, wherein the ear part includes a contact surface with respect to the sleeve situated on the turn-out side of the rotor.

5. The disk brake device according to claim 4, wherein the outer peripheral side notch section includes, on its side wall on a side of the side bridges situated on the turn-in side of the rotor, a contact surface contactable with the sleeve.

6. The disk brake device according to claim 3, wherein the ear parts have contact surfaces contactable with the sleeves respectively situated on both of the turn-in and turn-out sides of the rotor.

7. The disk brake device according to claim 4, wherein, where an axis parallel to a straight line passing a rotation center of the rotor and a center of the cylinder arranged positions is defined as a Y axis, two or four of the contact surfaces with respect to the sleeves are parallel to each other and are also parallel to the Y axis.

8. The disk brake device according to claim 3, wherein, a surface of the pressure plate opposed to the pawl part are provided with bosses configured to be fitted into penetration holes formed in the ear parts for threaded engagement.

9. The disk brake device according to claim 2, wherein, an anti-rattle spring is interposed between the caliper body and the sleeve.

10. The disk brake device according to claim 3, further comprising a pad clip including:

a cover plate for covering at least one of contact portions of the sleeves with the outer side brake pad and with the caliper body; and a main body plate interposed between the pressure plate and the pawl part, wherein the cover plate and the main body plate are connected together by a spring member.

11. The disk brake device according to claim 1, further comprising:

a cover for filling a step between the inner peripheral side notch section and the pawl part.

12. The disk brake device according to claim 11, wherein the cover includes:

a base plate interposed between the pawl part and a pressure plate of the outer side brake pad; and a cover plate exposed to the outer side through the inner peripheral side notch section formed in the pawl part.

13. The disk brake device according to claim 12, wherein the base plate has a fixing hole so that the base plate is fixed to the pawl part together with the outer side brake pad.

14. The disk brake device according to claim 1, wherein a turn-in side opening is formed between the center bridge and one of the side bridges, and a turn-out side opening is formed between the center bridge and the other of the side bridges.

* * * * *